(12) United States Patent
Hayakawa

(10) Patent No.: US 7,133,213 B2
(45) Date of Patent: Nov. 7, 2006

(54) ZOOM LENS SYSTEM

(75) Inventor: Satoshi Hayakawa, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/951,871

(22) Filed: Sep. 29, 2004

(65) Prior Publication Data
US 2005/0068636 A1     Mar. 31, 2005

(30) Foreign Application Priority Data
Sep. 30, 2003  (JP) .............................. 2003-341744

(51) Int. Cl.
*G02B 15/14*    (2006.01)
(52) U.S. Cl. ...................................... 359/686; 359/689
(58) Field of Classification Search ................ 359/689, 359/680–683, 686, 676, 781
See application file for complete search history.

(56) References Cited

U.S. PATENT DOCUMENTS

| | | | | |
|---|---|---|---|---|
| 5,523,888 A | * | 6/1996 | Nishio ........................ | 359/686 |
| 5,528,427 A | | 6/1996 | Tanaka et al. ............... | 359/683 |
| 5,781,348 A | * | 7/1998 | Ohtake ....................... | 359/676 |
| 5,859,729 A | * | 1/1999 | Misaka ........................ | 359/686 |
| 6,028,717 A | * | 2/2000 | Kohno et al. ................ | 359/690 |
| 6,721,105 B1 | * | 4/2004 | Ohtake et al. ............... | 359/676 |

FOREIGN PATENT DOCUMENTS

| | | |
|---|---|---|
| JP | 8-179213 | 7/1996 |
| JP | 9-304697 | 11/1997 |

* cited by examiner

*Primary Examiner*—Scott J. Sugarman
*Assistant Examiner*—M. Hasan
(74) *Attorney, Agent, or Firm*—Miles & Stockbridge PC

(57) ABSTRACT

An object is to provide a zoom lens system with a high zoom ratio capable of preferably correcting aberrations with securing sufficient amount of back focal length by well-suited power arrangement. The zoom lens system includes, in order from an object, a first lens group having positive refractive power, a second lens group having negative refractive power, a third lens group having positive refractive power, a fourth lens group having negative refractive power, and a fifth lens group having positive refractive power. When zooming from a wide-angle end state to a telephoto end state, a distance between the first and the second lens groups increases, a distance between the second and the third lens groups decreases, a distance between the third and the fourth lens groups increases and a distance between the fourth and the fifth lens groups decreases. A given conditional expression is satisfied.

25 Claims, 25 Drawing Sheets

ZOOM LENS SYSTEM

INCORPORATION BY REFERENCE

The disclosures of the following priority application is herein incorporated by reference:
Japanese Patent Application No. 2003-341744 filed Sep. 30, 2003.

BACKGROUND OF THE INVENTION

1. Field of the Invention

The present invention relates to a zoom lens system in particular to a zoom lens system with a high zoom ratio.

2. Related Background Art

As a zoom lens system with a high zoom ratio, it has been known a five-group type zoom lens composed of, in order from an object, a first lens group having positive refractive power, a second lens group having negative refractive power, a third lens group having positive refractive power, a fourth lens group having negative refractive power, and a fifth lens group having positive refractive power, for example, by Japanese Patent Application Laid-Open Nos. 8-179213 and 9-304697.

However, when a zoom lens having a short focal length is to be constructed on the basis of a zoom lens disclosed by Japanese Patent Application Laid-Open No. 8-179213, it is difficult to secure sufficient amount of back focal length.

Moreover, since a first lens group, a second lens group, a third lens group, and a fourth lens group of a zoom lens disclosed by Japanese Patent Application Laid-Open No. 9-304697 have strong refractive power, it becomes difficult to correct aberrations.

SUMMARY OF THE INVENTION

The present invention is made in view of the aforementioned problems and has an object to provide a zoom lens system with a high zoom ratio capable of preferably correcting aberrations with securing sufficient amount of back focal length by well-suited power arrangement.

According to one aspect of the present invention, a zoom lens system includes, in order from an object, a first lens group having positive refractive power, a second lens group having negative refractive power, a third lens group having positive refractive power, a fourth lens group having negative refractive power, and a fifth lens group having positive refractive power. When the state of lens group positions varies from a wide-angle end state to a telephoto end state, a distance between the first lens group and the second lens group increases, a distance between the second lens group and the third lens group decreases, a distance between the third lens group and the fourth lens group increases and a distance between the fourth lens group and the fifth lens group decreases. The following conditional expression (1) is satisfied:

$$0.655 < (-f2)/fw < 2.000 \tag{1}$$

where f2 denotes the focal length of the second lens group and fw denotes the focal length of the zoom lens system in the wide-angle end state.

In one preferred embodiment of the present invention, the following conditional expression (2) is preferably satisfied:

$$1.18 < f3/fw < 2.50 \tag{2}$$

where f3 denotes the focal length of the third lens group.

In one preferred embodiment of the present invention, the following conditional expression (3) is preferably satisfied:

$$1.92 < (-f4)/fw < 4.00 \tag{3}$$

where f4 denotes the focal length of the fourth lens group.

In one preferred embodiment of the present invention, the following conditional expression (4) is preferably satisfied:

$$3.78 < f1/fw < 6.00 \tag{4}$$

where f1 denotes the focal length of the first lens group.

In one preferred embodiment of the present invention, the following conditional expression (5) is preferably satisfied:

$$1.8 < BF/fw < 6.0 \tag{5}$$

where BF denotes the back focal length of the zoom lens system in the wide-angle end state.

Other feature and advantages according to the present invention will be readily understood from the detailed description of the preferred embodiments in conjunction with the accompanying drawings.

DESCRIPTION OF THE PREFERRED EMBODIMENTS

Figure 1:
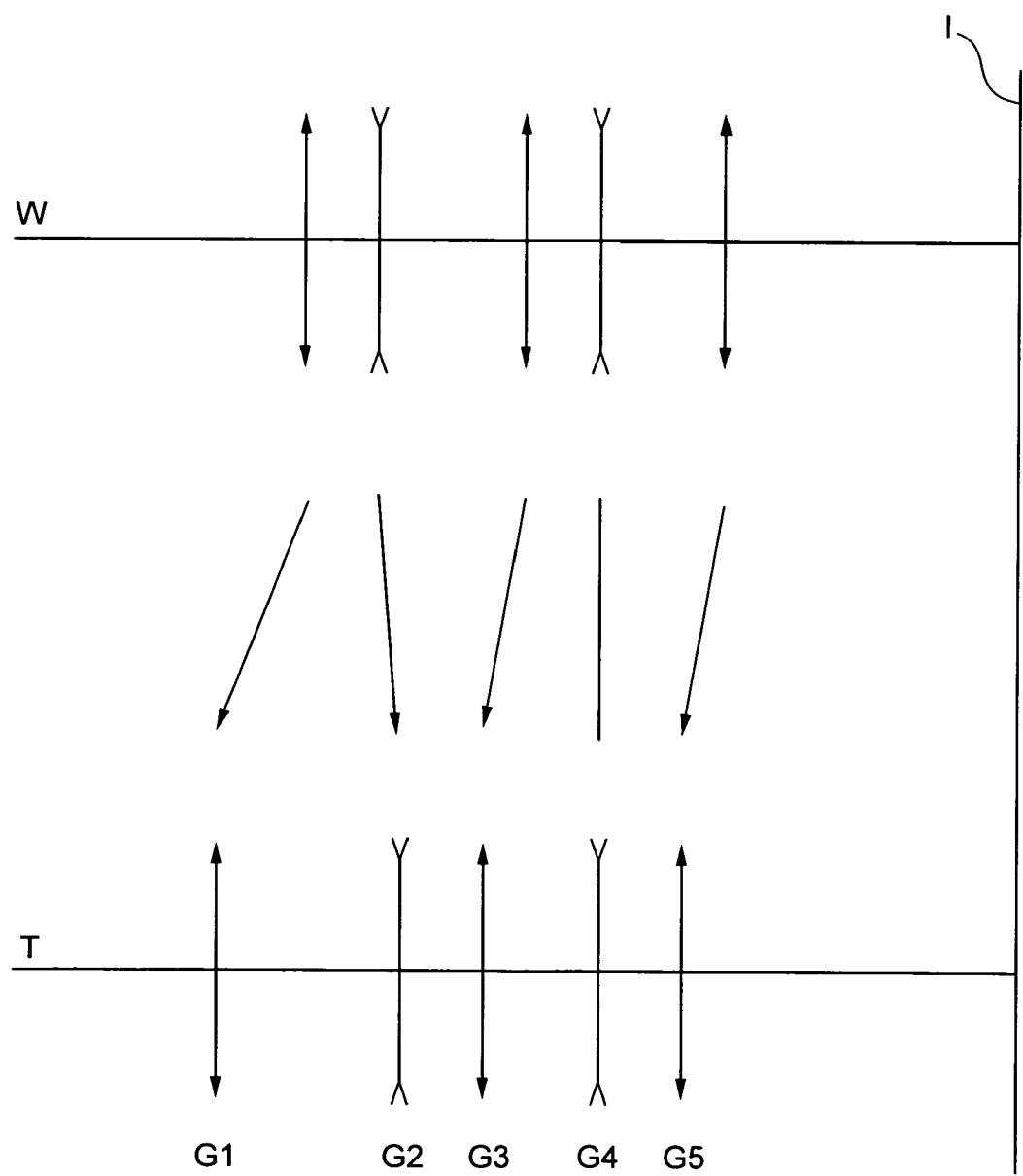
FIG. 1 is a drawing showing power arrangement of a zoom lens system according to each Example of the present invention together with moving trajectories of respective lens groups, in which W denotes a wide-angle end state and T denotes a telephoto end state.

A zoom lens system according to the present invention includes, in order from an object, a first lens group having positive refractive power, a second lens group having negative refractive power, a third lens group having positive refractive power, a fourth lens group having negative refractive power, a fifth lens group having positive refractive power. When the state of lens group positions varies from a wide-angle end state to a telephoto end state, a distance between the first lens group and the second lens group increases, a distance between the second lens group and the third lens group decreases, a distance between the third lens group and the fourth lens group increases, and a distance between the fourth lens group and the fifth lens group decreases. The following conditional expression is satisfied:

$$0.655 < (-f2)/fw < 2.000 \qquad (1)$$

where f2 denotes the focal length of the second lens group and fw denotes the focal length of the zoom lens system in a wide-angle end state.

Conditional expression (1) defines an appropriate range of the ratio of the focal length of the zoom lens system in a wide-angle end state to that of the second lens group. By satisfying conditional expression (1), a zoom lens system according to the present invention can easily correct aberrations and secure good optical performance without getting large in size.

In a zoom lens system according to the present invention, when the value (−f2)/fw is equal to or falls blow the lower limit of conditional expression (1), refractive power of the second lens group becomes large, so that it becomes difficult to correct curvature of field. On the other hand, when the value (−f2)/fw is equal to or exceeds the upper limit of conditional expression (1), refractive power of the second lens group becomes small. Since the moving amount of the second lens group upon zooming becomes large, the whole body of the zoom lens system becomes large.

In a zoom lens system according to the present invention, it is preferable that the lower limit of conditional expression (1) is set to 0.7. Accordingly, since refractive power of the second lens group becomes small, it becomes easy to correct aberrations and further preferable optical performance can be secured.

In a zoom lens system according to the present invention, it is preferable that the upper limit of conditional expression (1) is set to 1.0. Accordingly, since refractive power of the second lens group does not become too small, the moving amount of the second lens group upon zooming does not increase much, so that the zoom lens system can be compact.

In a zoom lens system according to the present invention, the following conditional expression (2) is preferably satisfied to secure satisfactory optical performance:

$$1.18 < f3/fw < 2.50 \qquad (2)$$

where f3 denotes the focal length of the third lens group and fw denotes the focal length of the zoom lens system in a wide-angle end state.

Conditional expression (2) defines an appropriate range of the ratio of the focal length of the zoom lens system in a wide-angle end state to that of the third lens group. By satisfying conditional expression (2), a zoom lens system according to the present invention can easily correct aberrations and secure good optical performance without getting large.

In a zoom lens system according to the present invention, when the ratio f3/fw is equal to or falls blow the lower limit of conditional expression (2), refractive power of the third lens group becomes large, so that it becomes difficult to correct spherical aberration. On the other hand, when the ratio f3/fw is equal to or exceeds the upper limit of conditional expression (2), refractive power of the third lens group becomes small, so that the whole body of the zoom lens system becomes large.

In a zoom lens system according to the present invention, it is preferable that the lower limit of conditional expression (2) is set to 1.30. Accordingly, since refractive power of the third lens group becomes small, it becomes easy to correct aberrations and further preferable optical performance can be secured.

In a zoom lens system according to the present invention, the following conditional expression (3) is preferably satisfied to secure preferable optical performance:

$$1.92 < (-f4)/fw < 4.00 \qquad (3)$$

where f4 denotes the focal length of the fourth lens group and fw denotes the focal length of the zoom lens system in a wide-angle end state.

Conditional expression (3) defines an appropriate range of the ratio of the focal length of the zoom lens system in a wide-angle end state to that of the fourth lens group. By satisfying conditional expression (3), a zoom lens system according to the present invention can easily correct aberrations and secure good optical performance without getting large in size.

In a zoom lens system according to the present invention, when the value (−f4)/fw is equal to or falls blow the lower limit of conditional expression (3), refractive power of the fourth lens group becomes large, so that it becomes difficult to correct coma. On the other hand, when the value (−f4)/fw is equal to or exceeds the upper limit of conditional expression (3), refractive power of the fourth lens group becomes small. Since the moving amount of the fourth lens group upon zooming becomes large, the whole body of the zoom lens system becomes large.

In a zoom lens system according to the present invention, it is preferable that the lower limit of conditional expression (3) is set to 1.95. Accordingly, since refractive power of the fourth lens group becomes small, it becomes easy to correct aberrations and further preferable optical performance can be secured.

In a zoom lens system according to the present invention, the following conditional expression (4) is preferably satisfied to secure preferable optical performance:

$$3.78 < f1/fw < 6.00 \quad (4)$$

where f1 denotes the focal length of the first lens group and fw denotes the focal length of the zoom lens system in a wide-angle end state.

Conditional expression (4) defines an appropriate range of the ratio of the focal length of the zoom lens system in a wide-angle end state to that of the first lens group. By satisfying conditional expression (4), a zoom lens system according to the present invention can easily correct aberrations and secure good optical performance without getting large in size.

In a zoom lens system according to the present invention, when the ratio f1/fw is equal to or falls blow the lower limit of conditional expression (4), refractive power of the first lens group becomes large, so that it becomes difficult to correct axial chromatic aberration. On the other hand, when the ratio f1/fw is equal to or exceeds the upper limit of conditional expression (4), refractive power of the first lens group becomes small. Since the moving amount of the first lens group upon zooming becomes large, the whole body of the zoom lens system becomes large.

In a zoom lens system according to the present invention, it is preferable that the lower limit of conditional expression (4) is set to 4.00. Accordingly, since refractive power of the first lens group becomes small, it becomes easy to correct aberrations and further preferable optical performance can be secured.

In a zoom lens system according to the present invention, the following conditional expression (5) is preferably satisfied to secure preferable optical performance:

$$1.8 < BF/fw < 6.00 \quad (5)$$

where BF denotes the back focal length of the zoom lens system in a wide-angle end state and fw denotes the focal length of the zoom lens system in a wide-angle end state.

Conditional expression (5) defines an appropriate range of the ratio of the focal length of the zoom lens system in a wide-angle end state to the back focal length of the zoom lens system in a wide-angle end state. By satisfying conditional expression (5), a zoom lens system according to the present invention can easily correct aberrations and secure good optical performance with securing sufficient space for arranging a mirror and a filter without getting large in size.

In a zoom lens system according to the present invention, when the ratio BF/fw is equal to or falls blow the lower limit of conditional expression (5), since the back focal length becomes small, it becomes difficult to secure sufficient space for arranging a mirror and a filter. On the other hand, when the ratio BF/fw is equal to or exceeds the upper limit of conditional expression (5), in order to secure the back focal length, the power arrangement of a zoom lens system according to the present invention becomes a retro-focus type. Accordingly, symmetry of the power arrangement becomes worse, so that it becomes difficult to correct off-axis aberrations such as curvature of field and distortion. Moreover, since the back focal length becomes large, the whole body of the zoom lens system becomes large.

In a zoom lens system according to the present invention, it is preferable that the lower limit of conditional expression (5) is set to 1.9. Accordingly, since the back focal length becomes sufficiently large, it becomes further easy to secure space for arranging a mirror and a filter.

A zoom lens system according to each example of the present invention is explained below with reference to accompanying drawings.

In each Example, an aspherical surface is expressed by the following expression;

$$x = cy^2/[1+(1-\kappa c^2 y^2)^{1/2}] + C_4 y^4 + C_6 y^6 + C_8 y^8 + C_{10} y^{10}$$

where y denotes a height from the optical axis, x denotes a sag amount, c denotes a curvature of a reference sphere (a paraxial curvature), κ denotes a conical coefficient, and $C_4$, $C_6$, $C_8$, $C_{10}$ denote $4^{th}$, $6^{th}$, $8^{th}$, $10^{th}$ order aspherical coefficients, respectively.

FIG. 1 is a drawing showing power arrangement of a zoom lens system according to each Example of the present invention together with moving trajectories of respective lens groups, in which W denotes a wide-angle end state and T denotes a telephoto end state.

A zoom lens system according to each Example of the present invention includes, in order from an object, a first lens group G1 having positive refractive power, a second lens group G2 having negative refractive power, a third lens group G3 having positive refractive power, a fourth lens group G4 having negative refractive power, a fifth lens group G5 having positive refractive power. When the state of lens group positions varies from a wide-angle end state to a telephoto end state, a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases.

EXAMPLE 1

Figure 2:
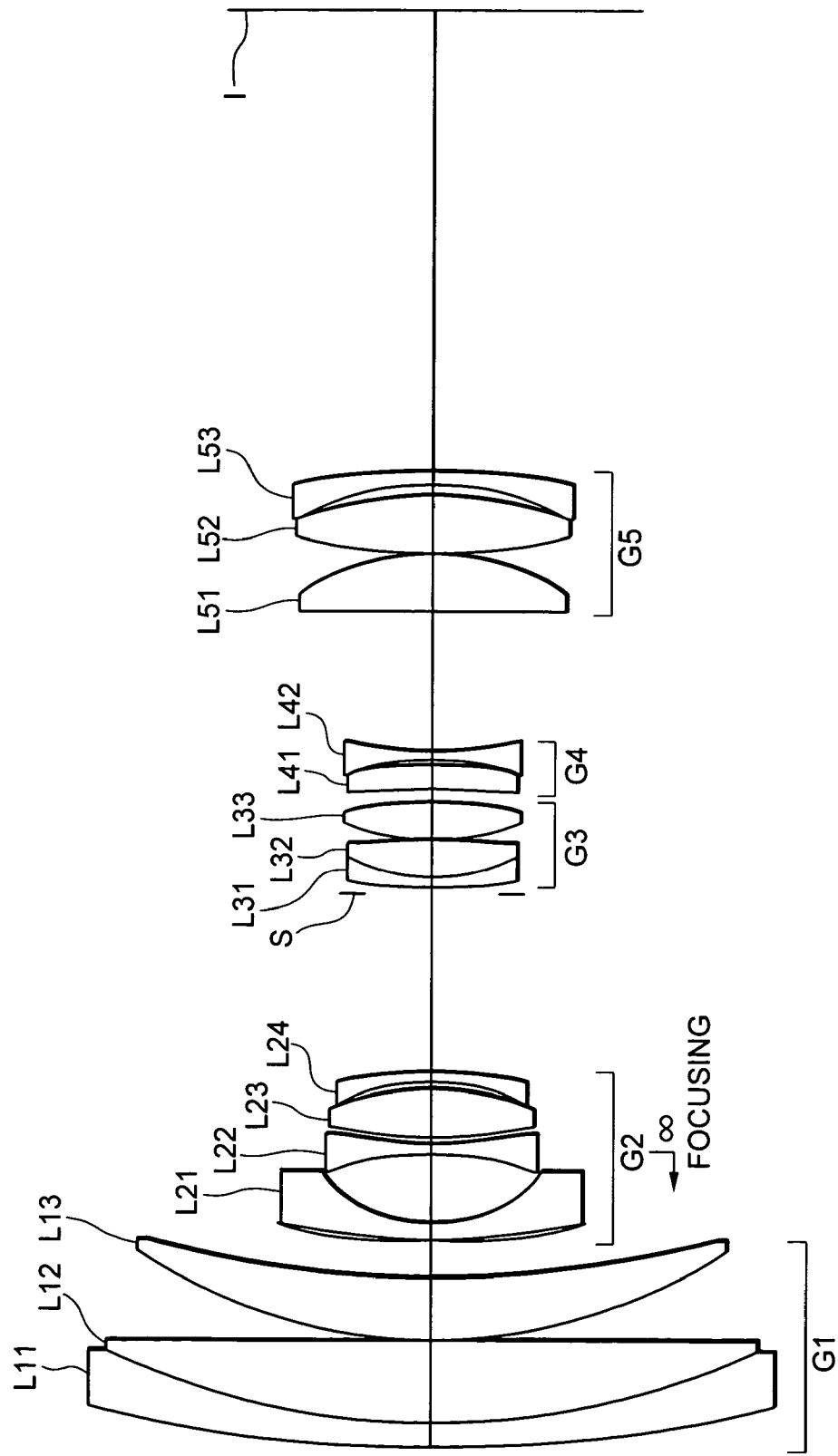
FIG. 2 is a drawing showing a lens construction of a zoom lens system according to Example 1 of the present invention.

FIG. 2 is a drawing showing a lens construction of a zoom lens system according to Example 1 of the present invention. By the way, each drawing showing a lens construction such as FIG. 2 shows a wide-angle end state.

In a zoom lens system according to Example 1 of the present invention, the first lens group G1 is composed of, in order from the object, a cemented lens constructed by a negative meniscus lens L11 having a convex surface facing to the object cemented with a positive meniscus lens L12 having a convex surface facing to the object, and a positive meniscus lens L13 having a convex surface facing to the object.

The second lens group G2 is composed of, in order from the object, a negative meniscus lens L21 having a convex surface facing to the object, a double concave negative lens L22, a double convex positive lens L23, and a negative meniscus lens L24 having a concave surface facing to the object.

The third lens group G3 is composed of, in order from the object, a cemented lens constructed by a negative meniscus lens L31 having a convex surface facing to the object cemented with a double convex positive lens L32, and a double convex positive lens L33.

The fourth lens group G4 is composed of, in order from the object, a positive meniscus lens L41 having a concave surface facing to the object, and a double concave negative lens L42.

The fifth lens group G5 is composed of, in order from the object, a positive meniscus lens L51 having a concave surface facing to the object, a double convex positive lens L52, and a negative meniscus lens L53 having a concave surface facing to the object.

In a zoom lens system according to Example 1 of the present invention, an aperture stop S is arranged to the object side of the third lens group G3 and is moved together with the third lens group G3 upon changing state of lens group positions.

Moreover, the negative lens L21 in the second lens group G2 has a thin resin layer with an aspherical shape on the object side surface.

In a zoom lens system according to Example 1 of the present invention, focusing is carried out by moving the second lens group G2 along the optical axis.

Although the moving trajectory from the wide-angle end state W to the telephoto end state T of the second lens group G2 shown as a straight line in FIG. 1 is actually a gentle S-shape in Example 1, the distance between the first lens group G1 and the second lens group G2 continuously increases without decreasing on the way to the telephoto end state T. By the way, the fourth lens group G4 is fixed upon zooming. The aperture stop S is arranged at the position by 0.6 mm to the object side of the most object side surface (15$^{th}$ surface) of the third lens group G3. This is the same in the other Examples.

Various values according to Example 1 are shown in Table 1. In Specifications, f denotes the focal length, FNO denotes f-number, and 2ω denotes the maximum value of the angle of view (unit: degree).

In Lens Data, Surface Number is the lens surface number counted in order from the object, r denotes a radius of curvature of the lens surface, d denotes a distance to the next lens surface, n denotes refractive index at d-line (λ=587.6 nm), υ denotes Abbe number at d-line, Dn (n: surface number) denotes a variable distance, and BF denotes the back focal length.

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used. The explanation of reference symbols is the same in the other Examples.

TABLE 1

[Specifications]

|   | wide-angle end state | intermediate focal length state | telephoto end state |
|---|---|---|---|
| f = | 18.7 | 35.0 | 67.9 |
| FNO = | 3.6 | 4.2 | 4.6 |
| 2ω = | 76.1 | 43.4 | 23.1° |

[Lens Data]

| Surface Number | r | d | n | ν |
|---|---|---|---|---|
| 1 | 128.2080 | 1.80 | 1.84666 | 23.8 |
| 2 | 62.1670 | 6.80 | 1.64000 | 60.1 |
| 3 | 7839.7782 | 0.10 | 1.00000 | |
| 4 | 42.7904 | 5.30 | 1.71300 | 53.9 |
| 5 | 95.6571 | D5 | 1.00000 | |
| *6 | 110.5079 | 0.08 | 1.55389 | 38.1 |
| 7 | 55.0277 | 1.20 | 1.80400 | 46.6 |
| 8 | 11.3585 | 5.90 | 1.00000 | |
| 9 | −23.6967 | 0.90 | 1.80400 | 46.6 |
| 10 | 45.6574 | 0.30 | 1.00000 | |
| 11 | 29.9481 | 4.10 | 1.79504 | 28.5 |
| 12 | −22.3485 | 0.80 | 1.00000 | |
| 13 | −15.5733 | 0.80 | 1.80400 | 46.6 |
| 14 | −28.1711 | D14 | 1.00000 | |
| 15 | 58.1769 | 0.80 | 1.80440 | 39.6 |
| 16 | 15.8142 | 3.20 | 1.49782 | 82.6 |
| 17 | −68.9654 | 0.10 | 1.00000 | |
| 18 | 21.2876 | 3.10 | 1.48749 | 70.4 |
| 19 | −36.7720 | D19 | 1.00000 | |
| 20 | −344.6416 | 2.20 | 1.84666 | 23.8 |
| 21 | −26.9474 | 0.28 | 1.00000 | |
| 22 | −21.8702 | 1.00 | 1.83481 | 42.7 |
| 23 | 54.7759 | D23 | 1.00000 | |
| 24 | −1292.7371 | 4.80 | 1.49782 | 82.5 |
| 25 | −19.1593 | 0.10 | 1.00000 | |
| 26 | 54.2606 | 4.70 | 1.49782 | 82.5 |
| 27 | −32.1957 | 1.10 | 1.00000 | |
| 28 | −21.8468 | 1.10 | 1.80518 | 25.4 |
| 29 | −59.8511 | BF | 1.00000 | |

[Aspherical Data]

Surface Number 6
κ = +15.4398
C4 = +2.5511 × 10$^{-5}$
C6 = −7.9835 × 10$^{-9}$
C8 = −2.6853 × 10$^{-10}$
C10 = +2.2060 × 10$^{-13}$

[Variable Distances]

|   | wide-angle end state | intermediate focal length state | telephoto end state |
|---|---|---|---|
| f | 18.7 | 35.0 | 67.9 |
| D5 | 2.98 | 15.56 | 31.36 |
| D14 | 15.50 | 7.83 | 2.84 |
| D19 | 0.98 | 6.94 | 10.68 |
| D23 | 11.77 | 5.82 | 2.07 |

[Values for Conditional Expressions]

| (1) (−f2)/fW = | 0.748 |
|---|---|
| (2) f3/fW = | 1.425 |
| (3) (−f4)/fW = | 2.212 |
| (4) f1/fW = | 4.209 |
| (5) BF/fW = | 2.035 |

Figure 3:
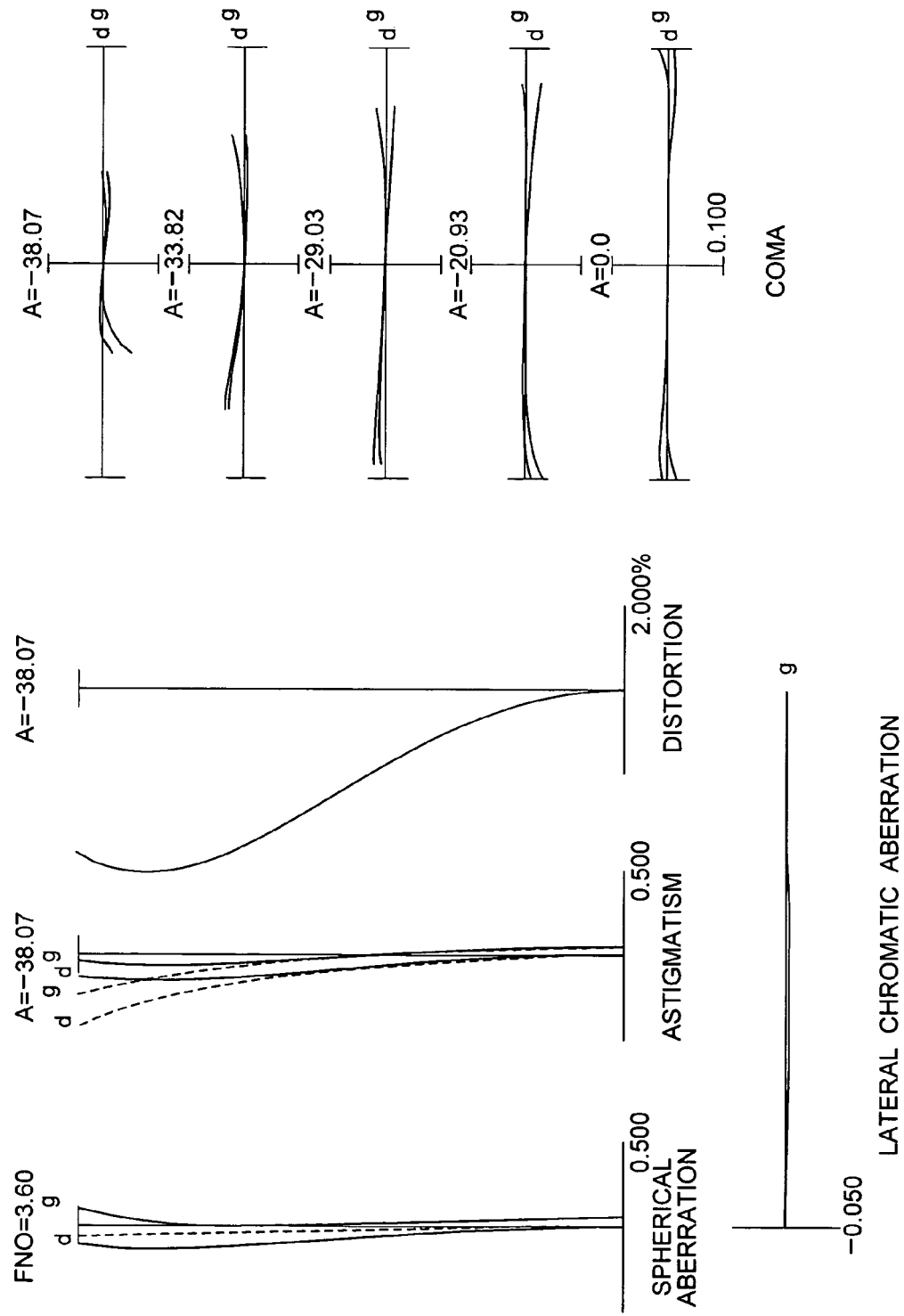
FIG. 3 graphically shows various aberrations of the zoom lens system according to Example 1 in a wide-angle end state (f=18.7) when the system is focused at infinity.
Figure 4:
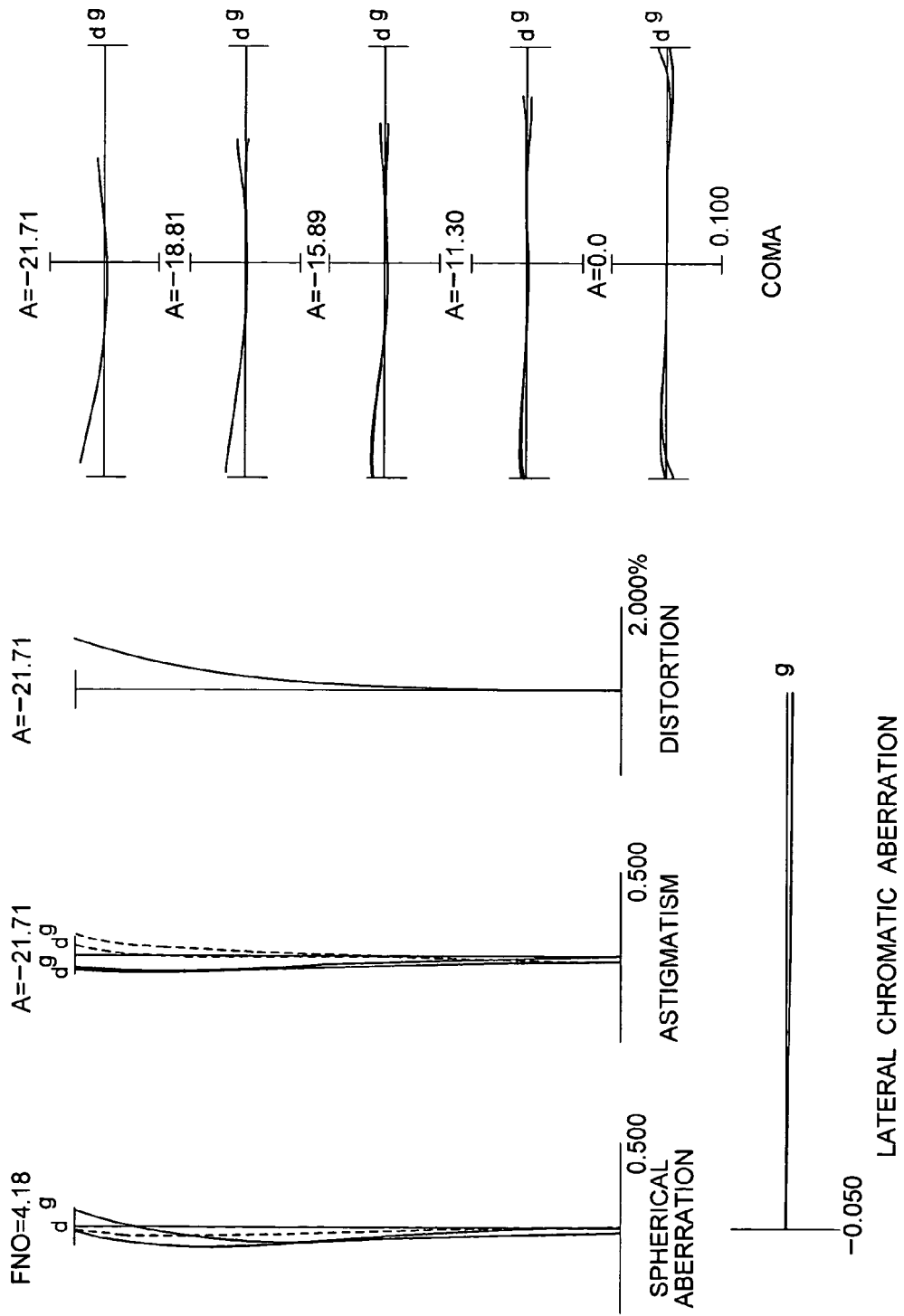
FIG. 4 graphically shows various aberrations of the zoom lens system according to Example 1 in an intermediate focal length state (f=35.0) when the system is focused at infinity.

FIG. 3 graphically shows various aberrations of the zoom lens system according to Example 1 in a wide-angle end state (f=18.7) when the system is focused at infinity. FIG. 4 graphically shows various aberrations of the zoom lens system according to Example 1 in an intermediate focal length state (f=35.0) when the system is focused at infinity.

Figure 5:
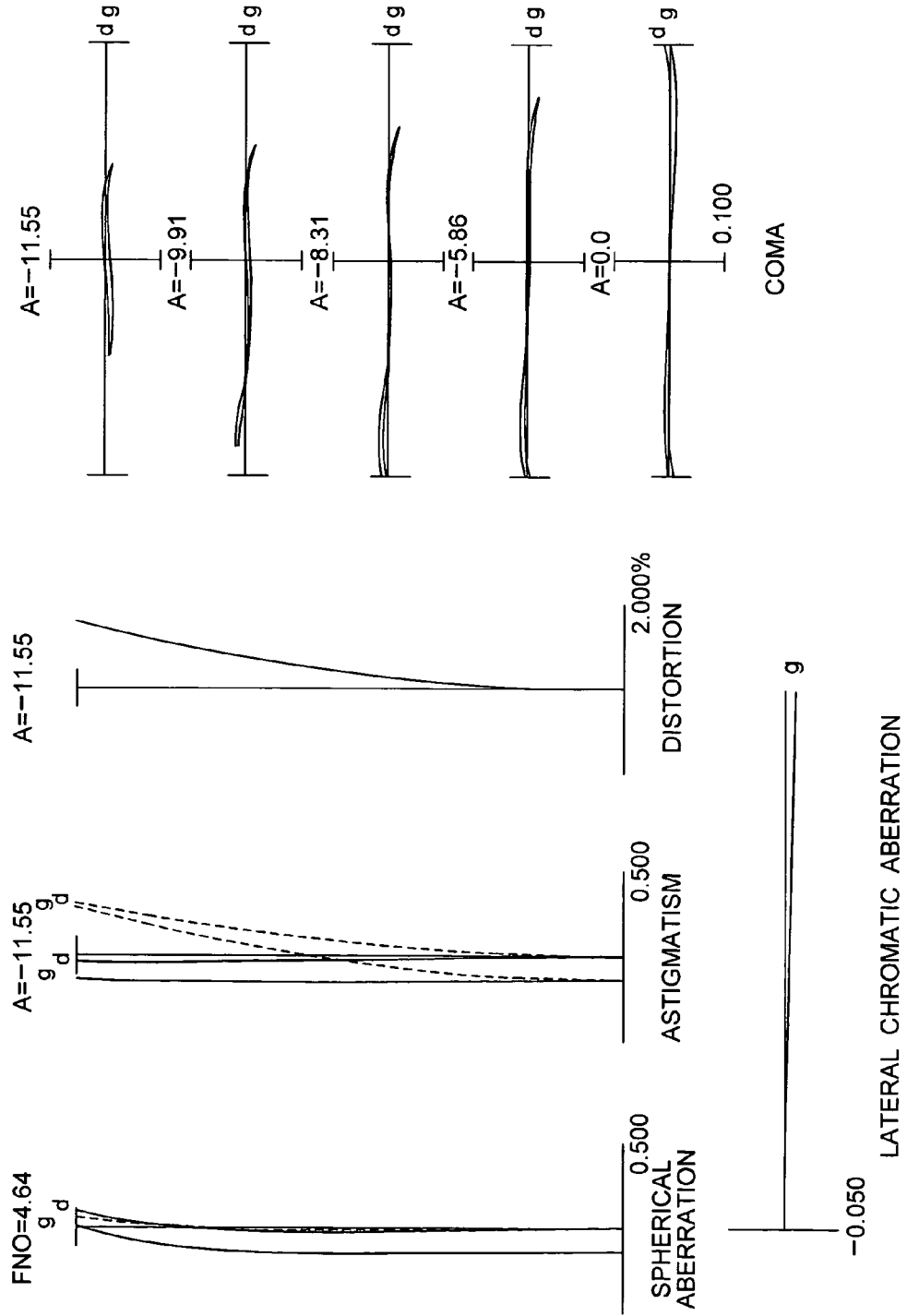
FIG. 5 graphically shows various aberrations of the zoom lens system according to Example 1 in a telephoto end state (f=67.9) when the system is focused at infinity.

FIG. 5 graphically shows various aberrations of the zoom lens system according to Example 1 in a telephoto end state (f=67.9) when the system is focused at infinity.

In respective graphs, FNO denotes the f-number, and A denotes a half angle of view. In the graphs showing astigmatism and distortion, the maximum value of a half angle of view A is shown. Reference symbol d, g denote aberration curves at d-line (λ=587.6 nm) and g-line (λ=435.8 nm), respectively.

In the graph showing spherical aberration, f-number shows the value at the maximum aperture and a solid line indicates spherical aberration and a broken line indicates sine condition.

In the graph showing astigmatism, a solid line indicates a sagittal image plane and a broken line indicates a meridional plane.

The above-described explanation regarding various aberration graphs is the same as the other examples.

As is apparent from the respective graphs, the zoom lens system according to Example 1 shows superb optical performance as a result of good corrections to various aberrations in each focal length state (the wide-angle end state, the intermediate focal length state, and the telephoto end state).

EXAMPLE 2

Figure 6:
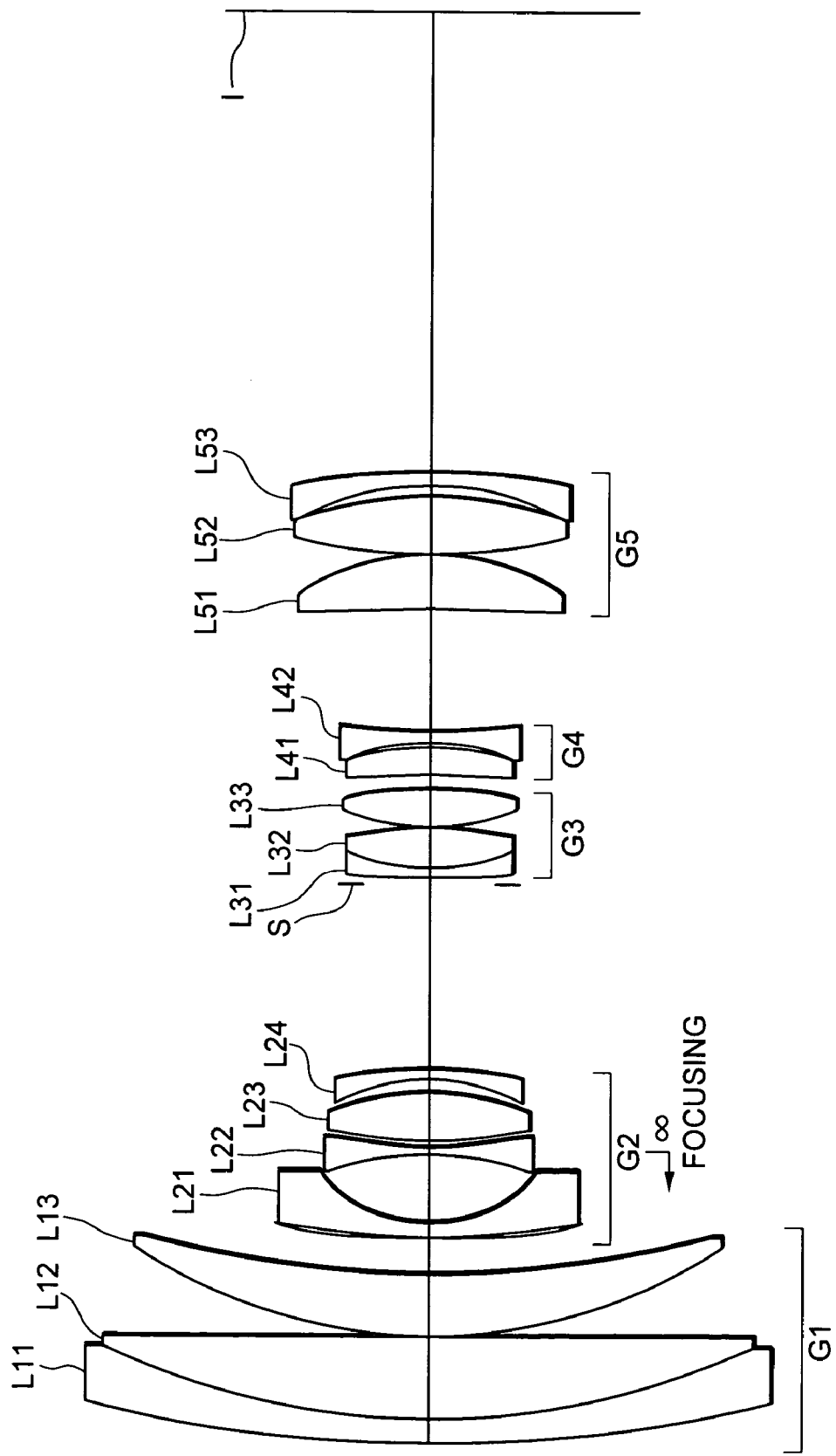
FIG. 6 is a drawing showing a lens construction of a zoom lens system according to Example 2 of the present invention.

FIG. 6 is a drawing showing a lens construction of a zoom lens system according to Example 2 of the present invention.

In a zoom lens system according to Example 2 of the present invention, the first lens group G1 is composed of, in order from the object, a cemented lens constructed by a negative meniscus lens L11 having a convex surface facing to the object cemented with a positive meniscus lens L12 having a convex surface facing to the object, and a positive meniscus lens L13 having a convex surface facing to the object.

The second lens group G2 is composed of, in order from the object, a negative meniscus lens L21 having a convex surface facing to the object, a double concave negative lens L22, a double convex positive lens L23, and a negative meniscus lens L24 having a concave surface facing to the object.

The third lens group G3 is composed of, in order from the object, a cemented lens constructed by a negative meniscus lens L31 having a convex surface facing to the object cemented with a double convex positive lens L32, and a double convex positive lens L33.

The fourth lens group G4 is composed of, in order from the object, a positive meniscus lens L41 having a concave surface facing to the object, and a double concave negative lens L42.

The fifth lens group G5 is composed of, in order from the object, a positive meniscus lens L51 having a concave surface facing to the object, a double convex positive lens L52, and a negative meniscus lens L53 having a concave surface facing to the object.

In a zoom lens system according to Example 2 of the present invention, an aperture stop S is arranged to the object side of the third lens group G3 and is moved together with the third lens group G3 upon changing state of lens group positions.

Moreover, the negative lens L21 in the second lens group G2 has a thin resin layer with an aspherical shape on the object side surface.

In a zoom lens system according to Example 2 of the present invention, focusing is carried out by moving the second lens group G2 along the optical axis.

Various values according to Example 2 are shown in Table 2.

TABLE 2

| [Specifications] | | | |
|---|---|---|---|
| | wide-angle end state | intermediate focal length state | telephoto end state |
| f = | 18.5 | 35.0 | 67.9 |
| FNO = | 3.6 | 4.2 | 4.6 |
| 2ω = | 76.8 | 43.4 | 23.2° |

| [Lens Data] | | | | |
|---|---|---|---|---|
| Surface Number | r | d | n | ν |
| 1 | 124.3307 | 1.80 | 1.84666 | 23.8 |
| 2 | 61.2506 | 6.60 | 1.65160 | 58.5 |
| 3 | 11530.4910 | 0.10 | 1.00000 | |
| 4 | 42.3132 | 5.30 | 1.71300 | 53.9 |
| 5 | 88.1999 | D5 | 1.00000 | |
| *6 | 178.2199 | 0.08 | 1.55389 | 38.1 |
| 7 | 70.7402 | 1.20 | 1.80400 | 46.6 |
| 8 | 11.8297 | 5.50 | 1.00000 | |
| 9 | −25.0152 | 0.80 | 1.80400 | 46.6 |
| 10 | 62.6799 | 0.40 | 1.00000 | |
| 11 | 34.6949 | 4.00 | 1.79504 | 28.5 |
| 12 | −21.9095 | 1.00 | 1.00000 | |
| 13 | −16.9368 | 0.90 | 1.80400 | 46.6 |
| 14 | −37.1720 | D14 | 1.00000 | |
| 15 | 88.6663 | 1.00 | 1.80440 | 39.6 |
| 16 | 16.5942 | 3.20 | 1.49782 | 82.6 |
| 17 | −39.9382 | 0.10 | 1.00000 | |
| 18 | 19.4599 | 3.10 | 1.48749 | 70.5 |
| 19 | −46.1789 | D19 | 1.00000 | |
| 20 | −68.6139 | 2.40 | 1.84666 | 23.8 |
| 21 | −18.6550 | 0.25 | 1.00000 | |
| 22 | −16.8011 | 1.00 | 1.83481 | 42.7 |
| 23 | 88.2943 | D23 | 1.00000 | |
| 24 | −212.7464 | 4.80 | 1.49782 | 82.5 |
| 25 | −17.5848 | 0.10 | 1.00000 | |
| 26 | 58.1044 | 4.40 | 1.49782 | 82.5 |
| 27 | −30.0046 | 1.20 | 1.00000 | |
| 28 | −19.6715 | 1.10 | 1.80518 | 25.4 |
| 29 | −48.4471 | BF | 1.00000 | |

[Aspherical Data]

Surface Number 6
κ = +1.8114
C4 = +2.9226 × $10^{-5}$
C6 = −9.0028 × $10^{-8}$
C8 = +4.1328 × $10^{-10}$
C10 = −6.8112 × $10^{-13}$

| [Variable Distances] | | | |
|---|---|---|---|
| | wide-angle end state | intermediate focal length state | telephoto end state |
| f | 18.5 | 35.0 | 67.9 |
| D5 | 3.10 | 16.19 | 31.44 |
| D14 | 16.22 | 8.31 | 3.10 |
| D19 | 1.37 | 6.84 | 10.52 |
| D23 | 10.48 | 5.00 | 1.33 |

| [Values for Conditional Expressions] | |
|---|---|
| (1) (−f2)/fW = | 0.755 |
| (2) f3/fW = | 1.389 |
| (3) (−f4)/fW = | 2.082 |
| (4) f1/fW = | 4.257 |
| (5) BF/fW = | 2.050 |

Figure 7:
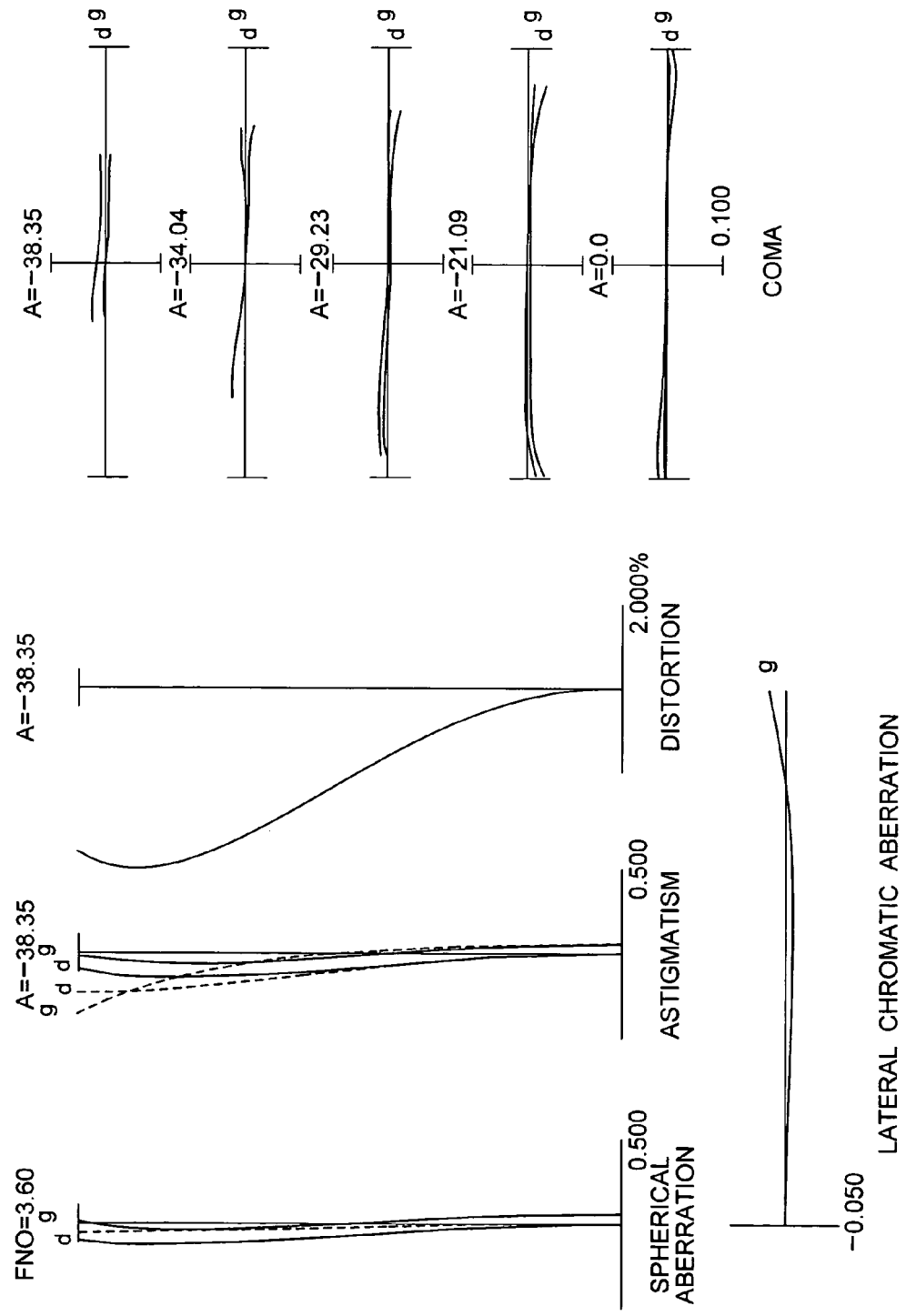
FIG. 7 graphically shows various aberrations of the zoom lens system according to Example 2 in a wide-angle end state (f=18.5) when the system is focused at infinity.
Figure 8:
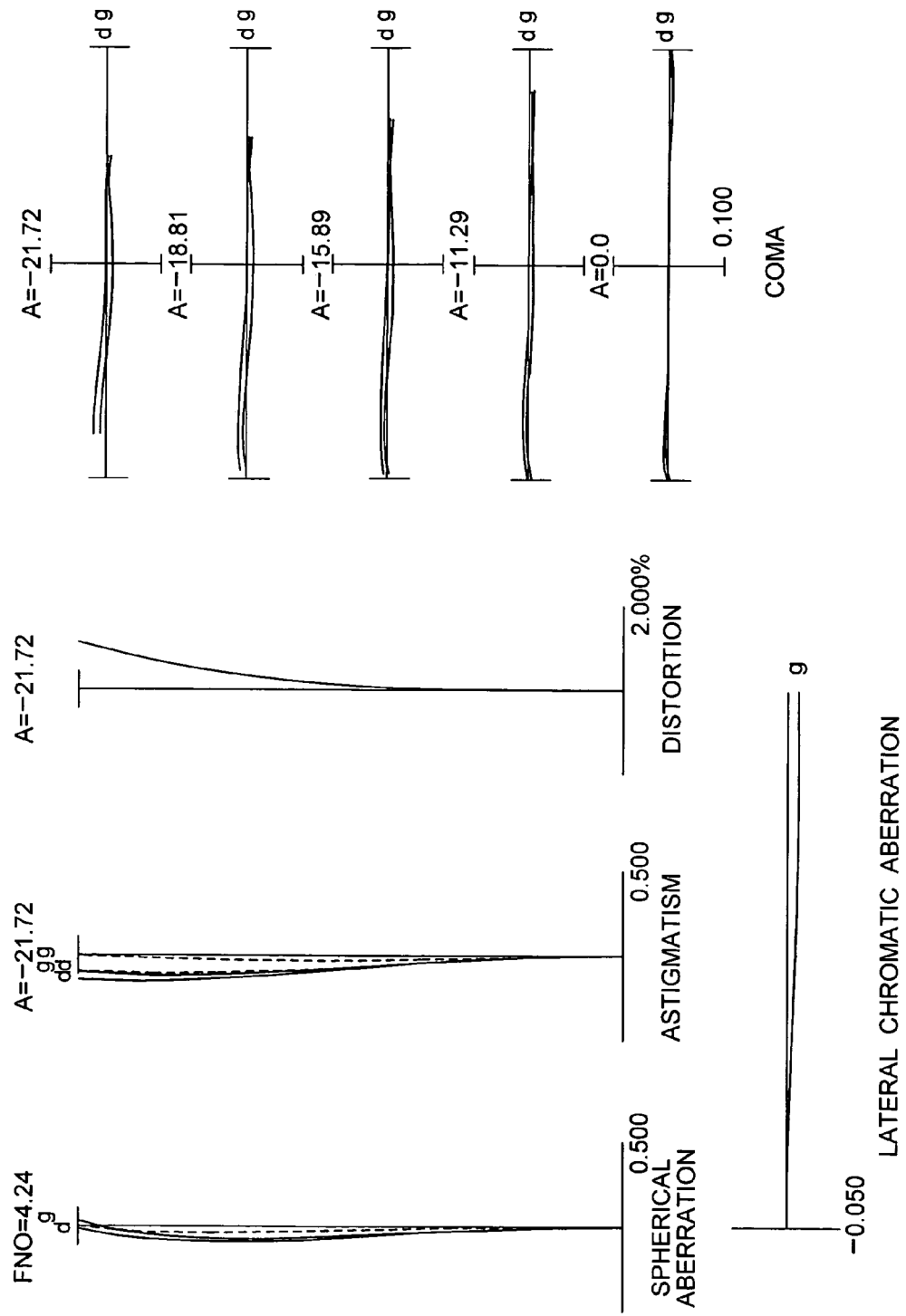
FIG. 8 graphically shows various aberrations of the zoom lens system according to Example 2 in an intermediate focal length state (f=35.0) when the system is focused at infinity.
Figure 9:
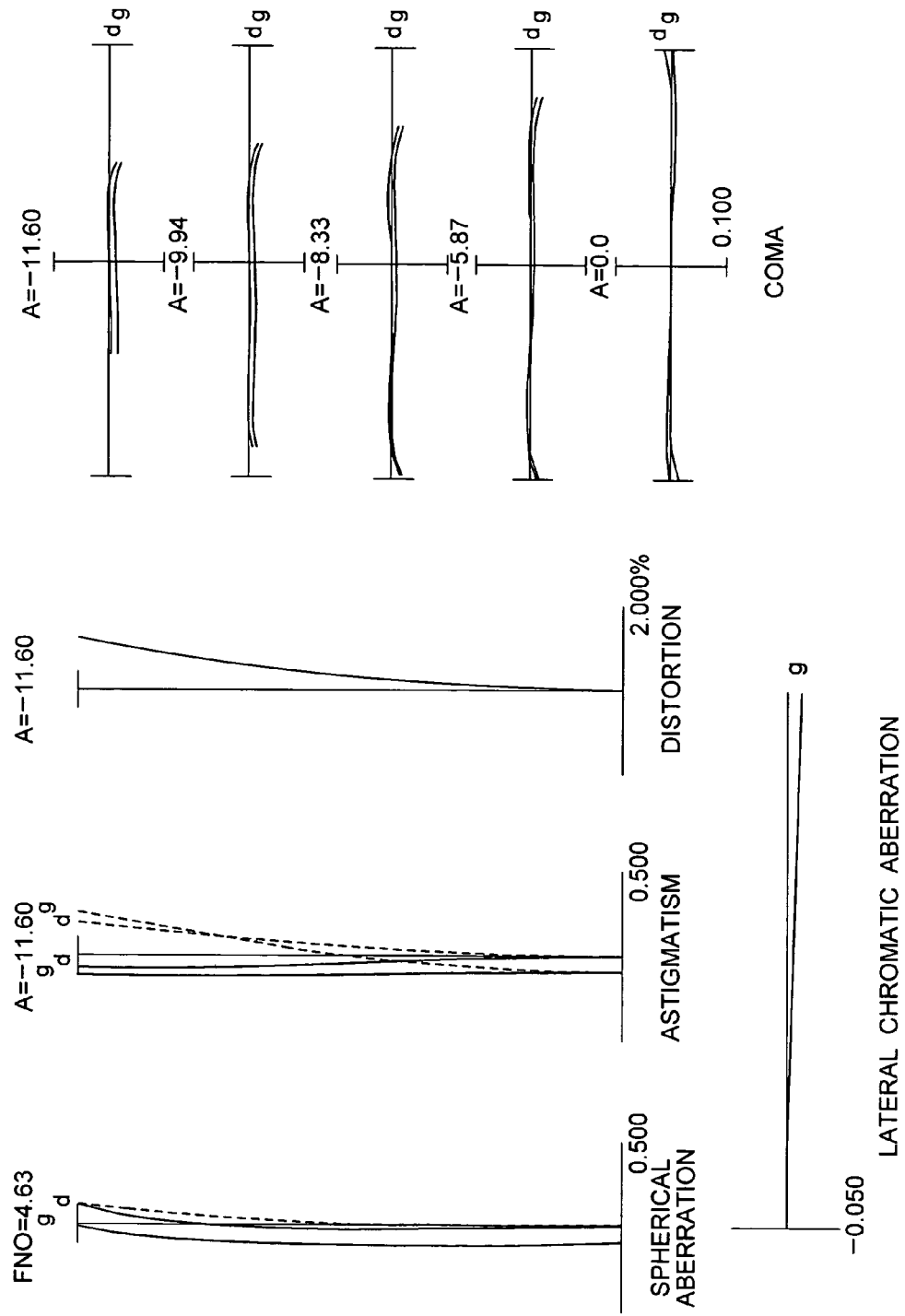
FIG. 9 graphically shows various aberrations of the zoom lens system according to Example 2 in a telephoto end state (f=67.9) when the system is focused at infinity.

FIG. 7 graphically shows various aberrations of the zoom lens system according to Example 2 in a wide-angle end state (f=18.5) when the system is focused at infinity. FIG. 8 graphically shows various aberrations of the zoom lens system according to Example 2 in an intermediate focal length state (f=35.0) when the system is focused at infinity. FIG. 9 graphically shows various aberrations of the zoom lens system according to Example 2 in a telephoto end state (f=67.9) when the system is focused at infinity.

As is apparent from the respective graphs, the zoom lens system according to Example 2 shows superb optical performance as a result of good corrections to various aberrations in each focal length state (the wide-angle end state, the intermediate focal length state, and the telephoto end state).

EXAMPLE 3

Figure 10:
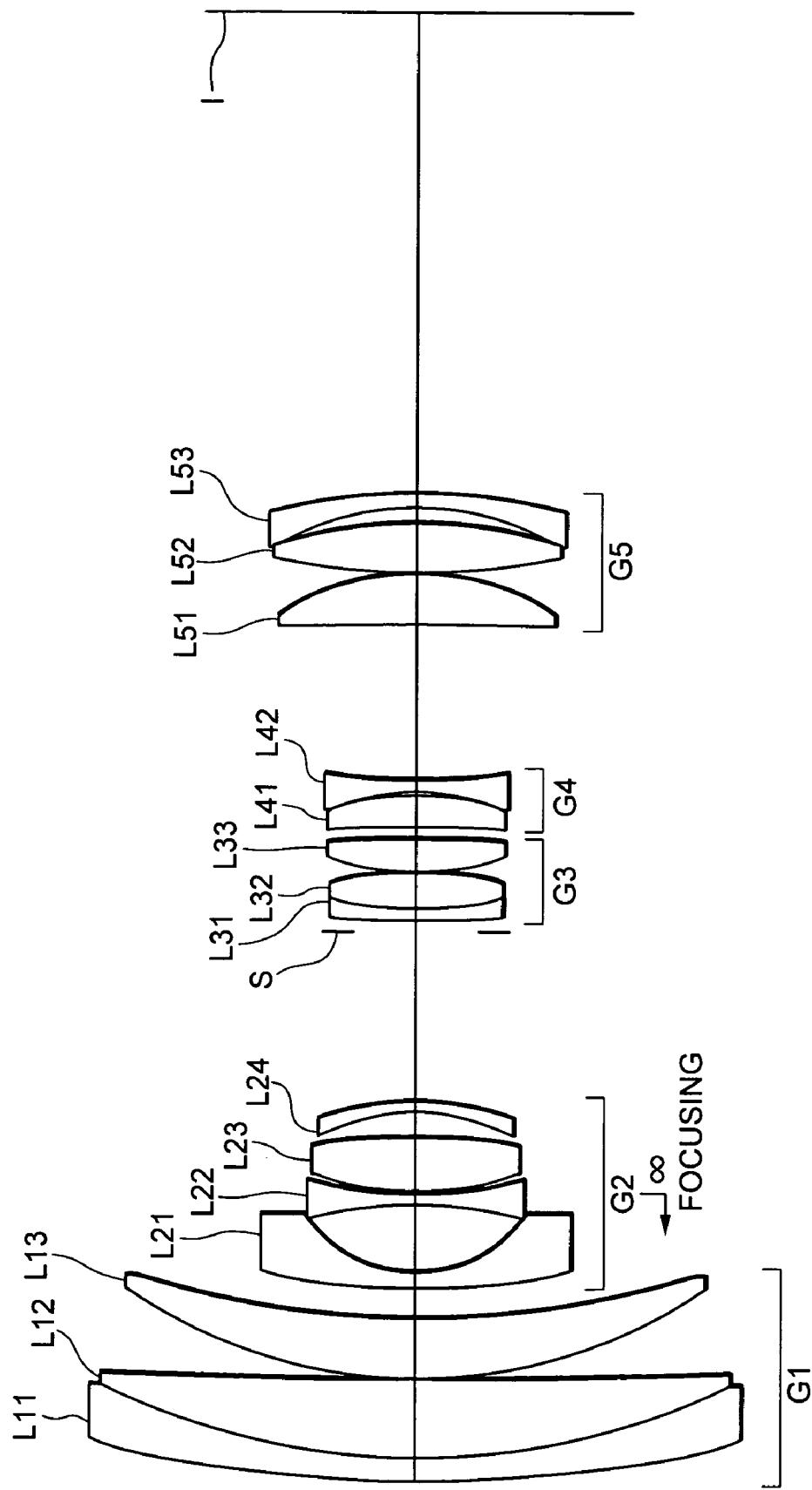
FIG. 10 is a drawing showing a lens construction of a zoom lens system according to Example 3 of the present invention.

FIG. 10 is a drawing showing a lens construction of a zoom lens system according to Example 3 of the present invention.

In a zoom lens system according to Example 3 of the present invention, the first lens group G1 is composed of, in order from the object, a cemented lens constructed by a negative meniscus lens L11 having a convex surface facing to the object cemented with a positive meniscus lens L12 having a convex surface facing to the object, and a positive meniscus lens L13 having a convex surface facing to the object.

The second lens group G2 is composed of, in order from the object, a negative meniscus lens L21 having a convex surface facing to the object, a double concave negative lens L22, a double convex positive lens L23, and a negative meniscus lens L24 having a concave surface facing to the object.

The third lens group G3 is composed of, in order from the object, a cemented lens constructed by a negative meniscus lens L31 having a convex surface facing to the object cemented with a double convex positive lens L32, and a double convex positive lens L33.

The fourth lens group G4 is composed of, in order from the object, a positive meniscus lens L41 having a concave surface facing to the object, and a double concave negative lens L42.

The fifth lens group G5 is composed of, in order from the object, a positive meniscus lens L51 having a concave surface facing to the object, a double convex positive lens L52, and a negative meniscus lens L53 having a concave surface facing to the object.

In a zoom lens system according to Example 3 of the present invention, an aperture stop S is arranged to the object side of the third lens group G3 and is moved together with the third lens group G3 upon changing state of lens group positions.

Moreover, the negative lens L21 in the second lens group G2 has a thin resin layer with an aspherical shape on the object side surface.

In a zoom lens system according to Example 3 of the present invention, focusing is carried out by moving the second lens group G2 along the optical axis.

Various values according to Example 3 are shown in Table 3.

TABLE 3

[Specifications]

| | wide-angle end state | intermediate focal length state | telephoto end state |
|---|---|---|---|
| f = | 18.5 | 35.0 | 67.9 |
| FNO = | 3.7 | 4.1 | 4.7 |
| 2ω = | 76.8 | 43.5 | 23.2° |

[Lens Data]

| Surface Number | r | d | n | ν |
|---|---|---|---|---|
| 1 | 110.1817 | 1.80 | 1.84666 | 23.8 |
| 2 | 59.5460 | 6.20 | 1.65160 | 58.5 |
| 3 | 852.0459 | 0.10 | 1.00000 | |
| 4 | 41.1615 | 4.80 | 1.71300 | 53.9 |
| 5 | 80.9700 | D5 | 1.00000 | |
| *6 | 88.1502 | 0.05 | 1.55389 | 38.1 |
| 7 | 57.9329 | 1.20 | 1.80400 | 46.6 |
| 8 | 10.9809 | 5.45 | 1.00000 | |
| 9 | −33.5744 | 0.80 | 1.80400 | 46.6 |
| 10 | 33.4124 | 0.20 | 1.00000 | |
| 11 | 25.4710 | 4.40 | 1.84666 | 23.8 |
| 12 | −48.5255 | 2.00 | 1.00000 | |
| 13 | −16.8318 | 0.90 | 1.80400 | 46.6 |
| 14 | −22.7161 | D14 | 1.00000 | |
| 15 | 104.5443 | 1.00 | 1.84666 | 23.8 |
| 16 | 27.9277 | 2.80 | 1.49782 | 82.6 |
| 17 | −31.4669 | 0.10 | 1.00000 | |
| 18 | 22.0926 | 2.70 | 1.48749 | 70.2 |
| 19 | −112.7613 | D19 | 1.00000 | |
| 20 | −103.5999 | 2.60 | 1.84666 | 23.8 |
| 21 | −20.1869 | 0.25 | 1.00000 | |
| 22 | −18.0994 | 1.00 | 1.83481 | 42.7 |
| 23 | 67.0711 | D23 | 1.00000 | |
| 24 | −548.6588 | 4.20 | 1.49782 | 82.5 |
| 25 | −19.5753 | 0.10 | 1.00000 | |
| 26 | 55.4155 | 4.00 | 1.49782 | 82.5 |
| 27 | −40.0896 | 1.30 | 1.00000 | |
| 28 | −22.7796 | 1.10 | 1.80518 | 25.4 |
| 29 | −45.7948 | BF | 1.00000 | |

[Aspherical Data]

Surface Number 6
κ = +1.8114
C4 = +2.9188 × 10$^{-5}$
C6 = −7.1082 × 10$^{-8}$
C8 = +1.3891 × 10$^{-10}$
C10 = +1.3642 × 10$^{-13}$

[Variable Distances]

| | wide-angle end state | intermediate focal length state | telephoto end state |
|---|---|---|---|
| f | 18.5 | 35.0 | 67.9 |
| D5 | 2.42 | 15.95 | 30.20 |
| D14 | 14.72 | 7.29 | 2.36 |
| D19 | 1.04 | 7.02 | 12.17 |
| D23 | 12.70 | 6.72 | 1.57 |

[Values for Conditional Expressions]

| | |
|---|---|
| (1) (−f2)/fW = | 0.755 |
| (2) f3/fW = | 1.429 |
| (3) (−f4)/fW = | 2.195 |
| (4) f1/fW = | 4.314 |
| (5) BF/fW = | 2.077 |

Figure 11:
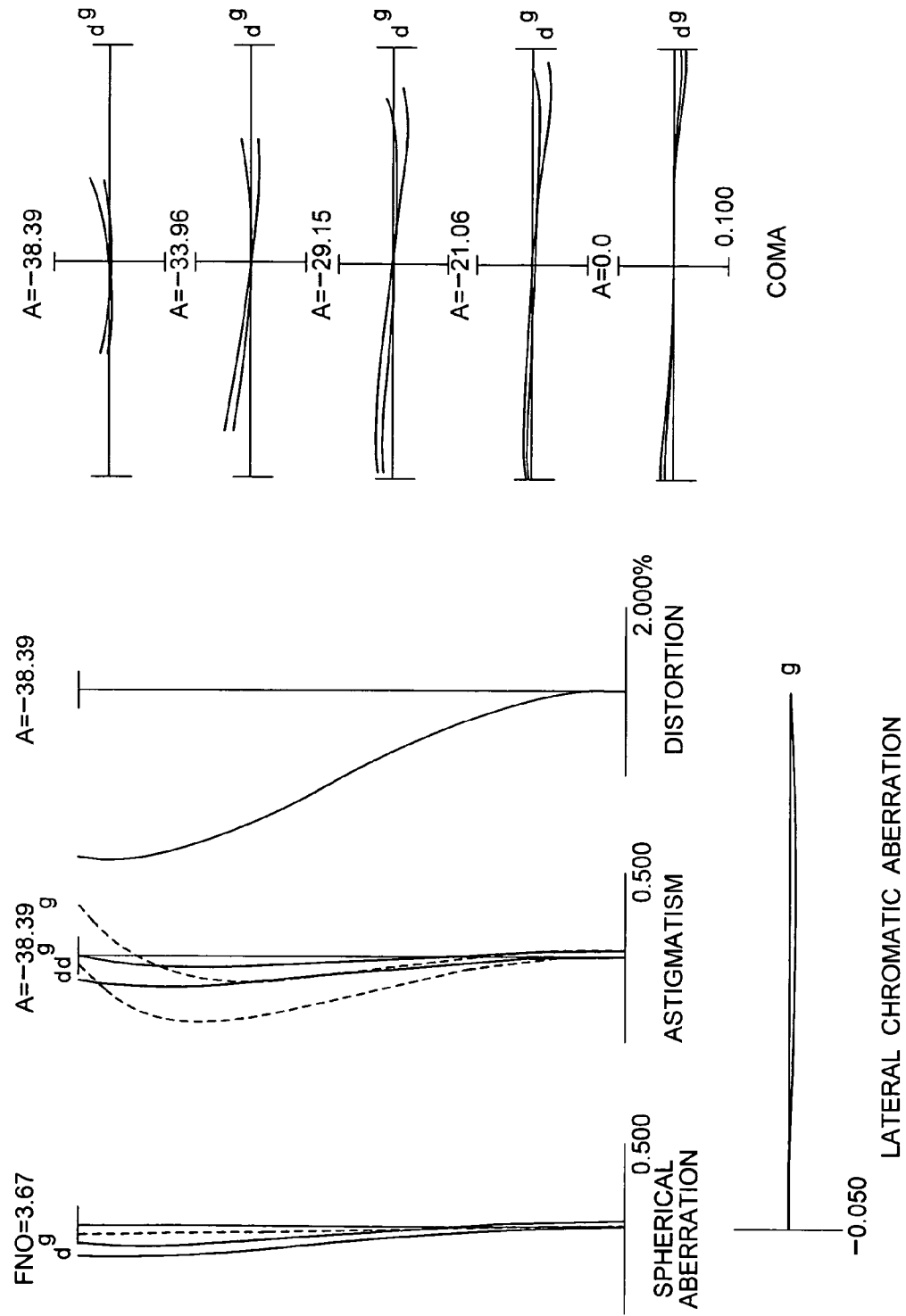
FIG. 11 graphically shows various aberrations of the zoom lens system according to Example 3 in a wide-angle end state (f=18.5) when the system is focused at infinity.
Figure 12:
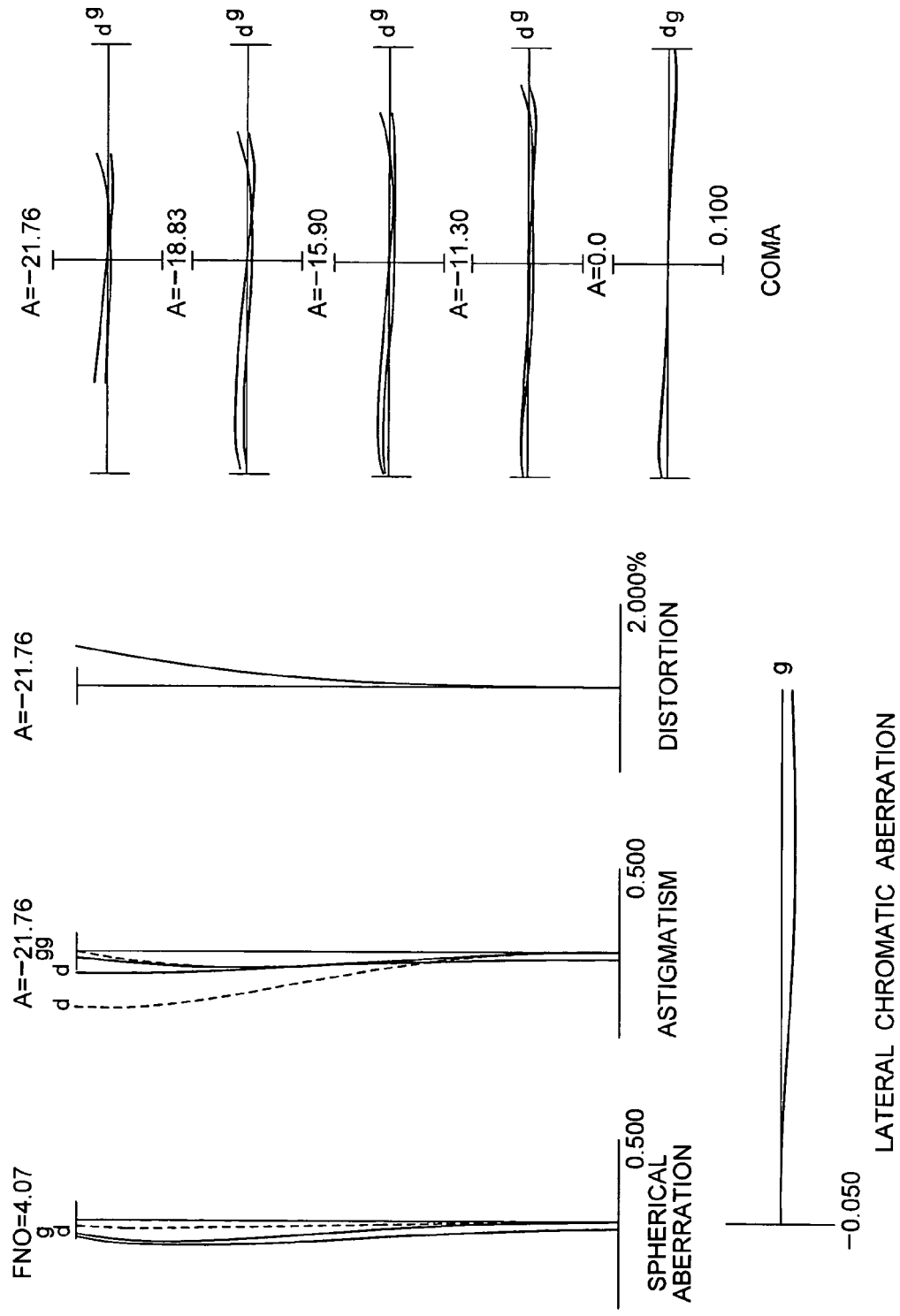
FIG. 12 graphically shows various aberrations of the zoom lens system according to Example 3 in an intermediate focal length state (f=35.0) when the system is focused at infinity.

FIG. 11 graphically shows various aberrations of the zoom lens system according to Example 3 in a wide-angle end state (f=18.5) when the system is focused at infinity. FIG. 12 graphically shows various aberrations of the zoom lens system according to Example 3 in an intermediate focal length state (f=35.0) when the system is focused at infinity.

Figure 13:
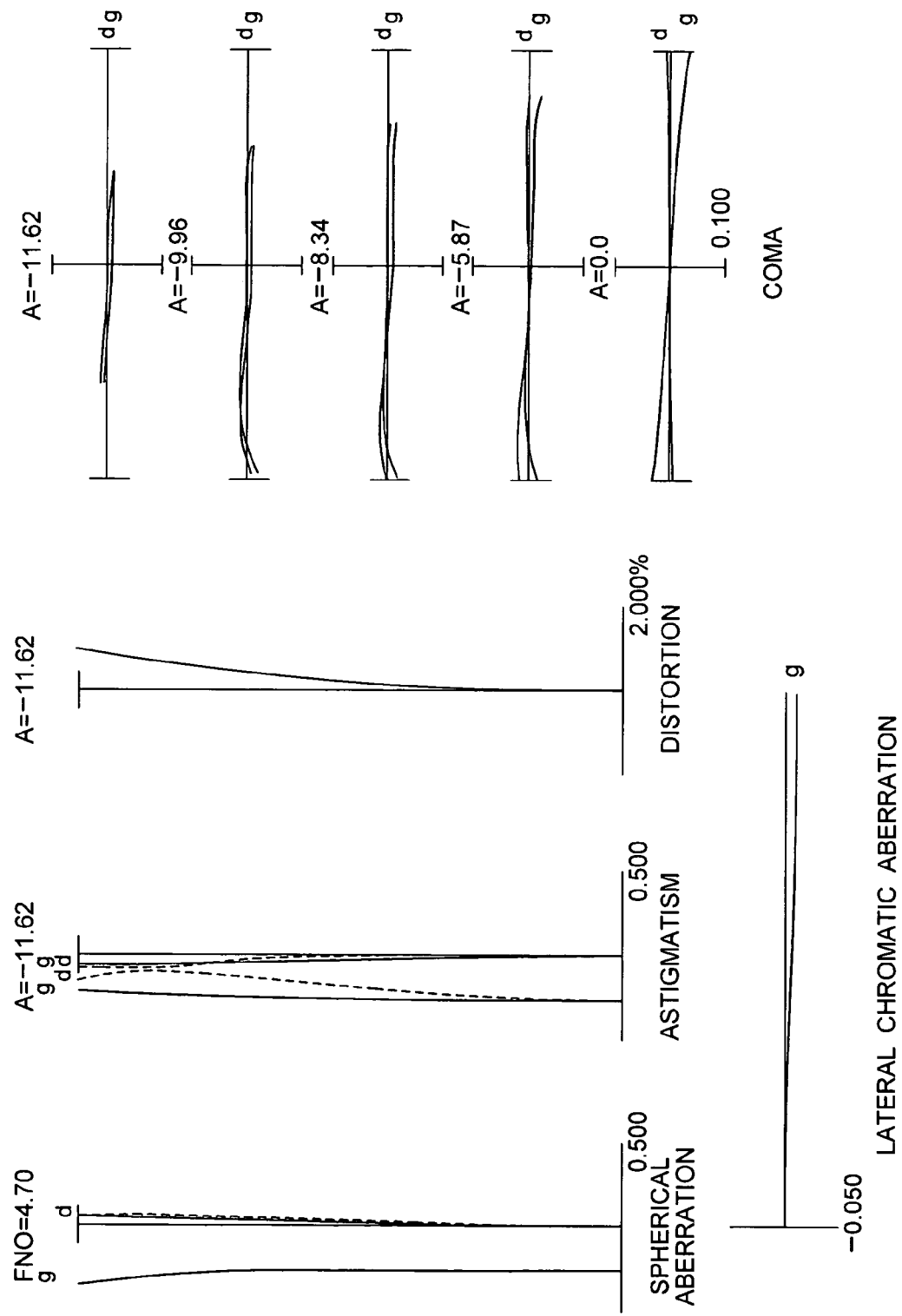
FIG. 13 graphically shows various aberrations of the zoom lens system according to Example 3 in a telephoto end state (f=67.9) when the system is focused at infinity.

FIG. 13 graphically shows various aberrations of the zoom lens system according to Example 3 in a telephoto end state (f=67.9) when the system is focused at infinity.

As is apparent from the respective graphs, the zoom lens system according to Example 3 shows superb optical performance as a result of good corrections to various aberrations in each focal length state (the wide-angle end state, the intermediate focal length state, and the telephoto end state).

EXAMPLE 4

Figure 14:
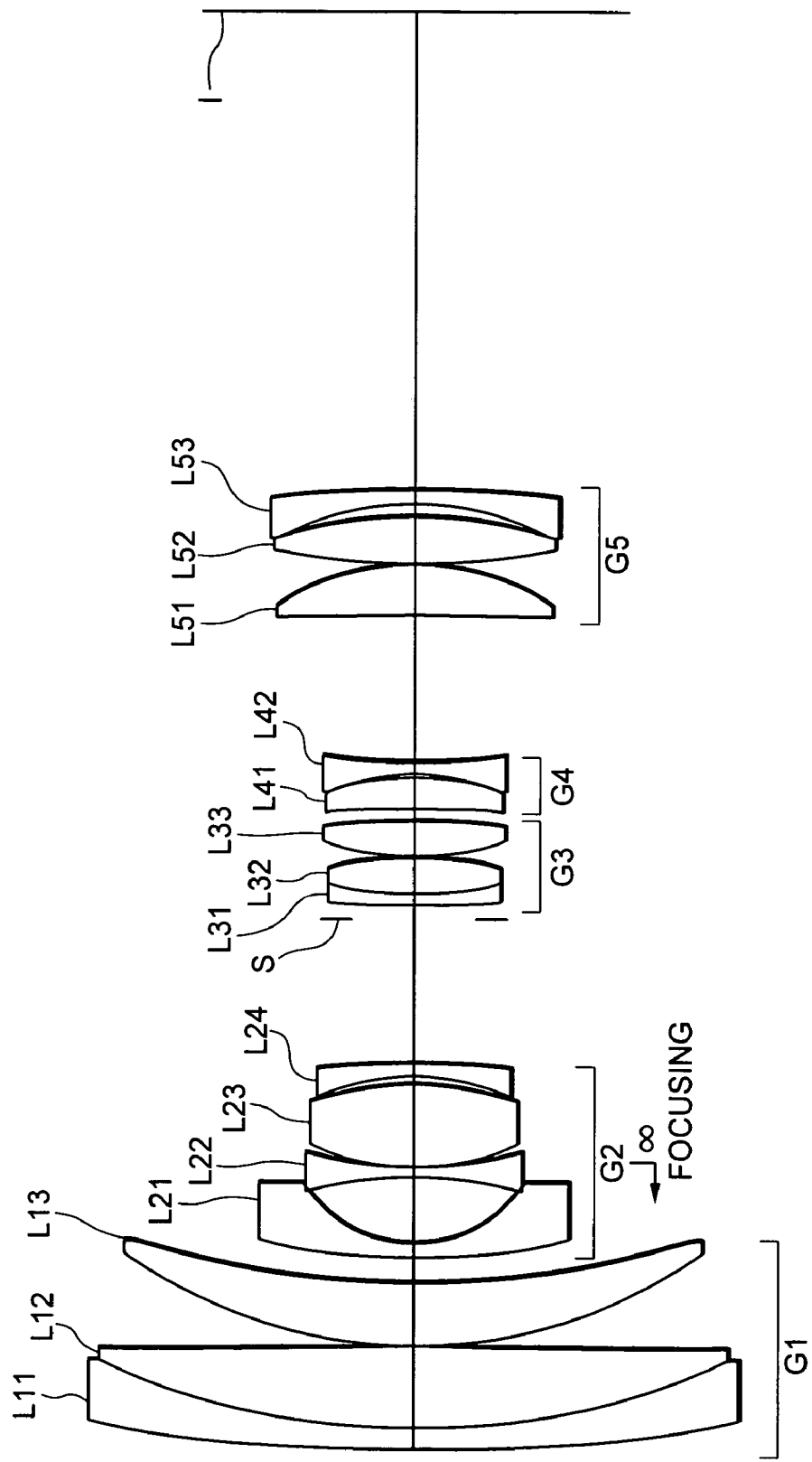
FIG. 14 is a drawing showing a lens construction of a zoom lens system according to Example 4 of the present invention.

FIG. 14 is a drawing showing a lens construction of a zoom lens system according to Example 4 of the present invention.

In a zoom lens system according to Example 4 of the present invention, the first lens group G1 is composed of, in order from the object, a cemented lens constructed by a negative meniscus lens L11 having a convex surface facing to the object cemented with a double convex positive lens L12, and a positive meniscus lens L13 having a convex surface facing to the object.

The second lens group G2 is composed of, in order from the object, a negative meniscus lens L21 having a convex surface facing to the object, a double concave negative lens L22, a double convex positive lens L23, and a negative meniscus lens L24 having a concave surface facing to the object.

The third lens group G3 is composed of, in order from the object, a cemented lens constructed by a negative meniscus lens L31 having a convex surface facing to the object cemented with a double convex positive lens L32, and a double convex positive lens L33.

The fourth lens group G4 is composed of, in order from the object, a positive meniscus lens L41 having a concave surface facing to the object, and a double concave negative lens L42.

The fifth lens group G5 is composed of, in order from the object, a positive meniscus lens L51 having a concave surface facing to the object, a double convex positive lens L52, and a negative meniscus lens L53 having a concave surface facing to the object.

In a zoom lens system according to Example 4 of the present invention, an aperture stop S is to the object side of the third lens group G3 and is moved together with the third lens group G3 upon changing state of lens group positions.

Moreover, the negative lens L21 in the second lens group G2 has a thin resin layer with an aspherical shape on the object side surface.

In a zoom lens system according to Example 4 of the present invention, focusing is carried out by moving the second lens group G2 along the optical axis.

Various values according to Example 4 are shown in Table 4.

TABLE 4

[Specifications]

| | wide-angle end state | intermediate focal length state | telephoto end state |
|---|---|---|---|
| f = | 18.5 | 35.0 | 67.9 |
| FNO = | 3.6 | 4.1 | 4.6 |
| 2ω = | 77.3 | 43.4 | 23.0° |

TABLE 4-continued

[Lens Data]

| Surface Number | r | d | n | ν |
|---|---|---|---|---|
| 1 | 151.2364 | 1.80 | 1.84666 | 23.8 |
| 2 | 62.8398 | 6.40 | 1.71300 | 53.9 |
| 3 | −1406.5626 | 0.10 | 1.00000 | |
| 4 | 39.3712 | 5.00 | 1.71300 | 53.9 |
| 5 | 79.7200 | D5 | 1.00000 | |
| *6 | 60.3132 | 0.05 | 1.55389 | 38.1 |
| 7 | 52.8688 | 1.20 | 1.83481 | 42.7 |
| 8 | 10.8038 | 5.35 | 1.00000 | |
| 9 | −33.5317 | 0.80 | 1.83481 | 42.7 |
| 10 | 31.7747 | 0.10 | 1.00000 | |
| 11 | 22.1158 | 6.65 | 1.84666 | 23.8 |
| 12 | −24.7341 | 0.65 | 1.00000 | |
| 13 | −18.7145 | 0.90 | 1.83481 | 42.7 |
| 14 | −96.7465 | D14 | 1.00000 | |
| 15 | 77.5773 | 1.00 | 1.84666 | 23.8 |
| 16 | 22.8979 | 3.10 | 1.49782 | 82.6 |
| 17 | −29.3394 | 0.10 | 1.00000 | |
| 18 | 21.6214 | 3.00 | 1.48749 | 70.2 |
| 19 | −65.7425 | D19 | 1.00000 | |
| 20 | −66.6153 | 2.60 | 1.84666 | 23.8 |
| 21 | −18.7149 | 0.25 | 1.00000 | |
| 22 | −17.0173 | 1.00 | 1.83481 | 42.7 |
| 23 | 78.1841 | D23 | 1.00000 | |
| 24 | −238.6949 | 4.00 | 1.60311 | 60.7 |
| 25 | −20.3768 | 0.10 | 1.00000 | |
| 26 | 61.8499 | 3.95 | 1.60311 | 60.7 |
| 27 | −36.7762 | 1.05 | 1.00000 | |
| 28 | −23.6170 | 1.10 | 1.80518 | 25.4 |
| 29 | −88.5913 | BF | 1.00000 | |

[Aspherical Data]

Surface Number 6
κ = +1.8114
C4 = +1.2672 × $10^{-5}$
C6 = −3.8269 × $10^{-8}$
C8 = +9.8377 × $10^{-11}$
C10 = −7.3351 × $10^{-14}$

[Variable Distances]

| | wide-angle end state | intermediate focal length state | telephoto end state |
|---|---|---|---|
| f | 18.5 | 35.0 | 67.9 |
| D5 | 2.00 | 13.27 | 27.99 |
| D14 | 12.79 | 6.60 | 2.75 |
| D19 | 1.00 | 7.43 | 11.52 |
| D23 | 12.12 | 5.69 | 1.60 |

[Values for Conditional Expressions]

| (1) (−f2)/fW = | 0.666 |
|---|---|
| (2) f3/fW = | 1.276 |
| (3) (−f4)/fW = | 1.993 |
| (4) f1/fW = | 3.983 |
| (5) BF/fW = | 2.077 |

Figure 15:
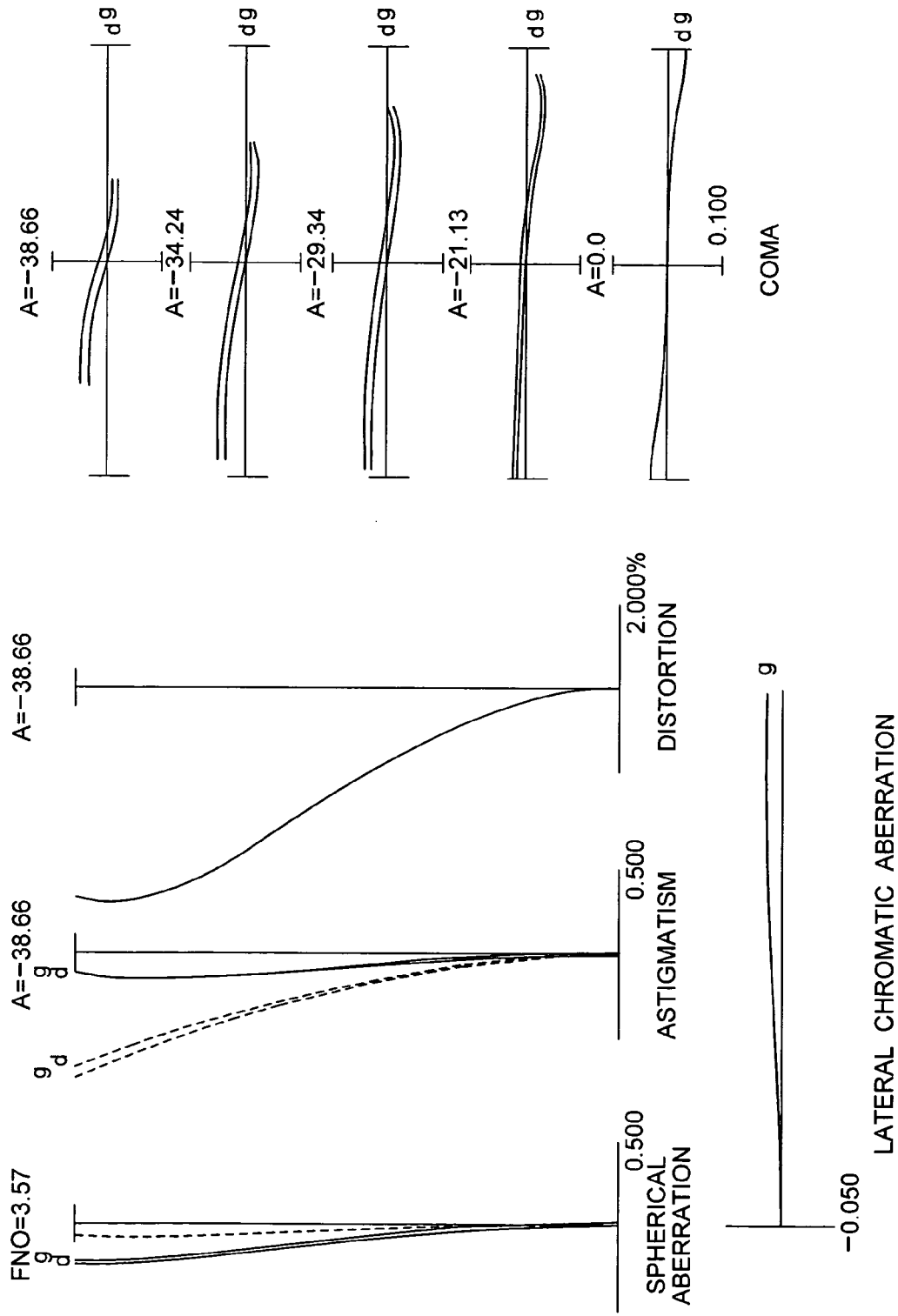
FIG. 15 graphically shows various aberrations of the zoom lens system according to Example 4 in a wide-angle end state (f=18.5) when the system is focused at infinity.
Figure 16:
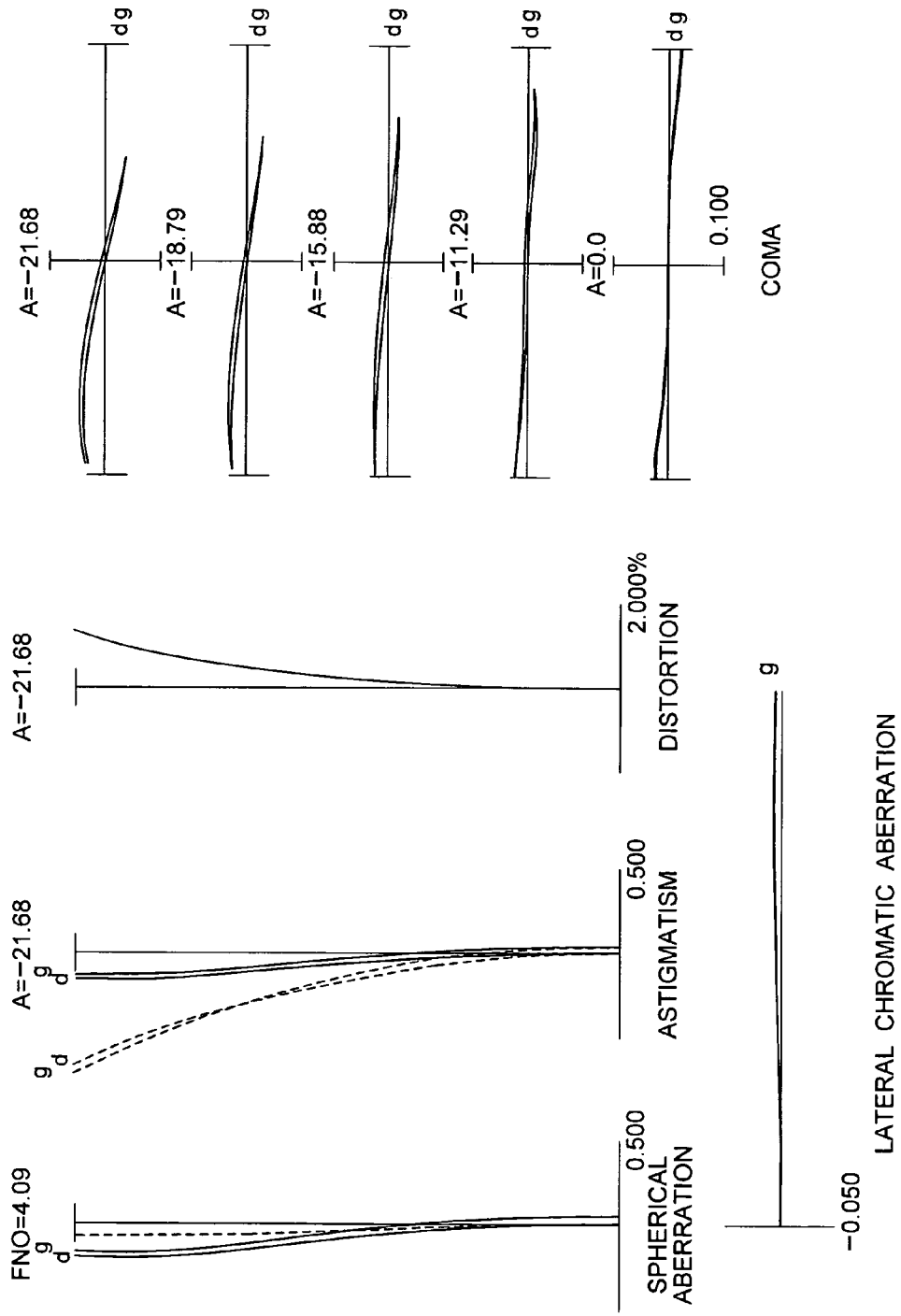
FIG. 16 graphically shows various aberrations of the zoom lens system according to Example 4 in an intermediate focal length state (f=35.0) when the system is focused at infinity.
Figure 17:
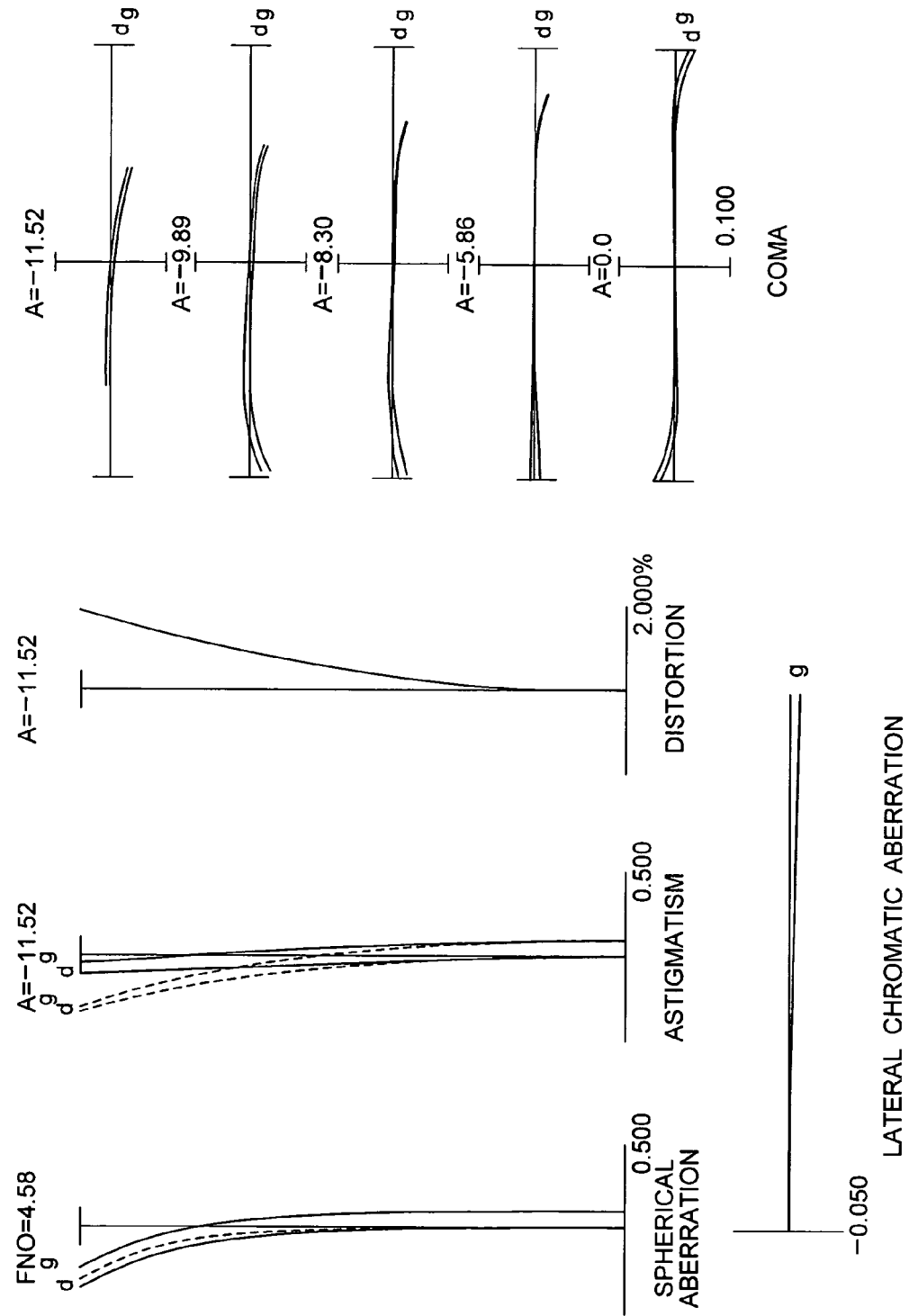
FIG. 17 graphically shows various aberrations of the zoom lens system according to Example 4 in a telephoto end state (f=67.9) when the system is focused at infinity.

FIG. 15 graphically shows various aberrations of the zoom lens system according to Example 4 in a wide-angle end state (f=18.5) when the system is focused at infinity. FIG. 16 graphically shows various aberrations of the zoom lens system according to Example 4 in an intermediate focal length state (f=35.0) when the system is focused at infinity. FIG. 17 graphically shows various aberrations of the zoom lens system according to Example 4 in a telephoto end state (f=67.9) when the system is focused at infinity.

As is apparent from the respective graphs, the zoom lens system according to Example 4 shows superb optical performance as a result of good corrections to various aberra-

EXAMPLE 5

Figure 18:
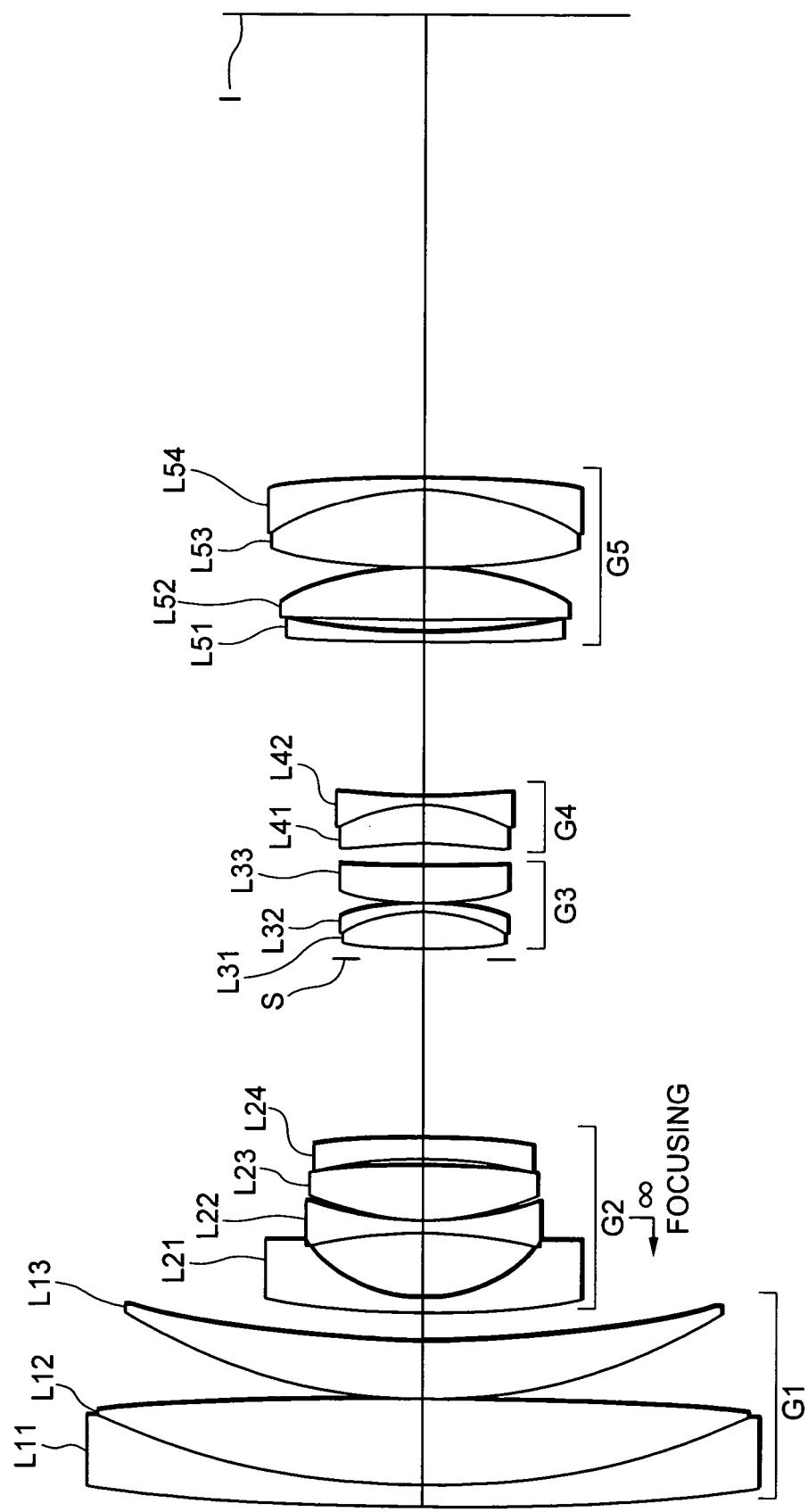
FIG. 18 is a drawing showing a lens construction of a zoom lens system according to Example 5 of the present invention.

FIG. 18 is a drawing showing a lens construction of a zoom lens system according to Example 5 of the present invention.

In a zoom lens system according to Example 5 of the present invention, the first lens group G1 is composed of, in order from the object, a cemented lens constructed by a negative meniscus lens L11 having a convex surface facing to the object cemented with a double convex positive lens L12, and a positive meniscus lens L13 having a convex surface facing to the object.

The second lens group G2 is composed of, in order from the object, a negative meniscus lens L21 having a convex surface facing to the object, a double concave negative lens L22, a double convex positive lens L23, and a negative meniscus lens L24 having a concave surface facing to the object.

The third lens group G3 is composed of, in order from the object, a cemented lens constructed by a double convex positive lens L31 cemented with a negative meniscus lens L32 having a concave surface facing to the object, and a positive meniscus lens L33 having a convex surface facing to the object.

The fourth lens group G4 is composed of, in order from the object, a cemented lens constructed by a positive meniscus lens L41 having a concave surface facing to the object cemented with a double concave negative lens L42.

The fifth lens group G5 is composed of, in order from the object, a negative meniscus lens L51 having a convex surface facing to the object, a double convex positive lens L52, a cemented lens constructed by a double convex positive lens L53 cemented with a negative meniscus lens L54 having a concave surface facing to the object.

In a zoom lens system according to Example 5 of the present invention, an aperture stop S is arranged to the object side of the third lens group G3 and is moved together with the third lens group G3 upon changing state of lens group positions.

Moreover, the negative lens L21 in the second lens group G2 has a thin resin layer with an aspherical shape on the object side surface.

In a zoom lens system according to Example 5 of the present invention, focusing is carried out by moving the second lens group G2 along the optical axis.

Various values according to Example 5 are shown in Table 5.

TABLE 5

[Specifications]

|  | wide-angle end state | intermediate focal length state | telephoto end state |
|---|---|---|---|
| f = | 18.5 | 35.0 | 68.9 |
| FNO = | 3.6 | 4.2 | 4.7 |
| 2ω = | 77.3 | 43.1 | 22.5° |

[Lens Data]

| Surface Number | r | d | n | ν |
|---|---|---|---|---|
| 1 | 284.1586 | 1.80 | 1.80518 | 25.4 |
| 2 | 68.8089 | 7.15 | 1.65160 | 58.5 |
| 3 | −328.3989 | 0.10 | 1.00000 | |
| 4 | 47.8822 | 4.80 | 1.80400 | 46.6 |
| 5 | 106.2469 | D5 | 1.00000 | |
| *6 | 88.4245 | 0.05 | 1.55389 | 38.1 |
| 7 | 82.4371 | 1.20 | 1.80400 | 46.6 |
| 8 | 12.3994 | 5.55 | 1.00000 | |
| 9 | −36.9229 | 1.00 | 1.80400 | 46.6 |
| 10 | 28.8217 | 0.10 | 1.00000 | |
| 11 | 23.3428 | 4.50 | 1.80518 | 25.4 |
| 12 | −83.4963 | 0.60 | 1.00000 | |
| 13 | −40.6610 | 1.80 | 1.77250 | 49.6 |
| 14 | −58.6668 | D14 | 1.00000 | |
| 15 | 62.8676 | 3.05 | 1.51680 | 64.1 |
| 16 | −14.2857 | 0.80 | 1.80518 | 25.4 |
| 17 | −22.4038 | 0.10 | 1.00000 | |
| 18 | 28.5651 | 3.10 | 1.51680 | 64.1 |
| 19 | 151.4959 | D19 | 1.00000 | |
| 20 | −58.9618 | 3.35 | 1.75520 | 27.5 |
| 21 | −14.0975 | 0.80 | 1.80400 | 46.6 |
| 22 | 95.9452 | D22 | 1.00000 | |
| 23 | 181.0203 | 0.80 | 1.77250 | 49.6 |
| 24 | 58.9407 | 1.05 | 1.00000 | |
| 25 | 393.2129 | 4.55 | 1.60311 | 60.7 |
| 26 | −25.9096 | 0.10 | 1.00000 | |
| 27 | 59.1555 | 6.65 | 1.65160 | 58.5 |
| 28 | −23.7409 | 1.00 | 1.84666 | 23.8 |
| 29 | −91.8950 | BF | 1.00000 | |

[Aspherical Data]

Surface Number 6
κ = +0.0000
C4 = +7.9215 × 10$^{-6}$
C6 = −2.5717 × 10$^{-8}$
C8 = −2.1070 × 10$^{-11}$
C10 = +3.3289 × 10$^{-14}$

[Variable Distances]

|  | wide-angle end state | intermediate focal length state | telephoto end state |
|---|---|---|---|
| f | 18.5 | 35.0 | 68.9 |
| D5 | 2.44 | 13.41 | 30.91 |
| D14 | 16.33 | 7.08 | 2.00 |
| D19 | 1.93 | 9.34 | 14.17 |
| D22 | 13.29 | 5.88 | 1.04 |

[Values for Conditional Expressions]

(1) (−f2)/fW = 0.802
(2) f3/fW = 1.395
(3) (−f4)/fW = 2.158
(4) f1/fW = 4.443

(5) BF/fW = 2.104    (5)

Figure 19:
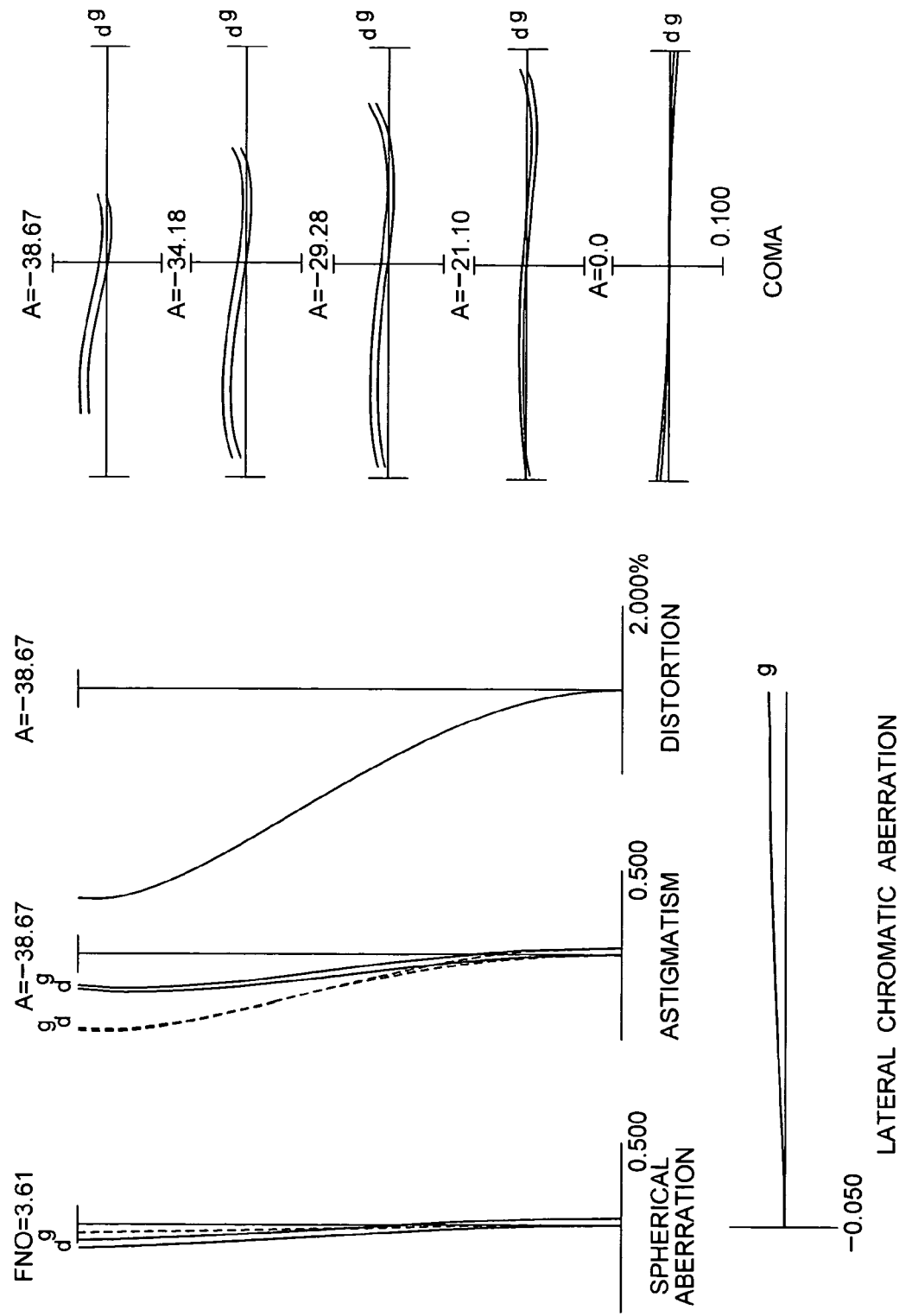
FIG. 19 graphically shows various aberrations of the zoom lens system according to Example 5 in a wide-angle end state (f=18.5) when the system is focused at infinity.
Figure 20:
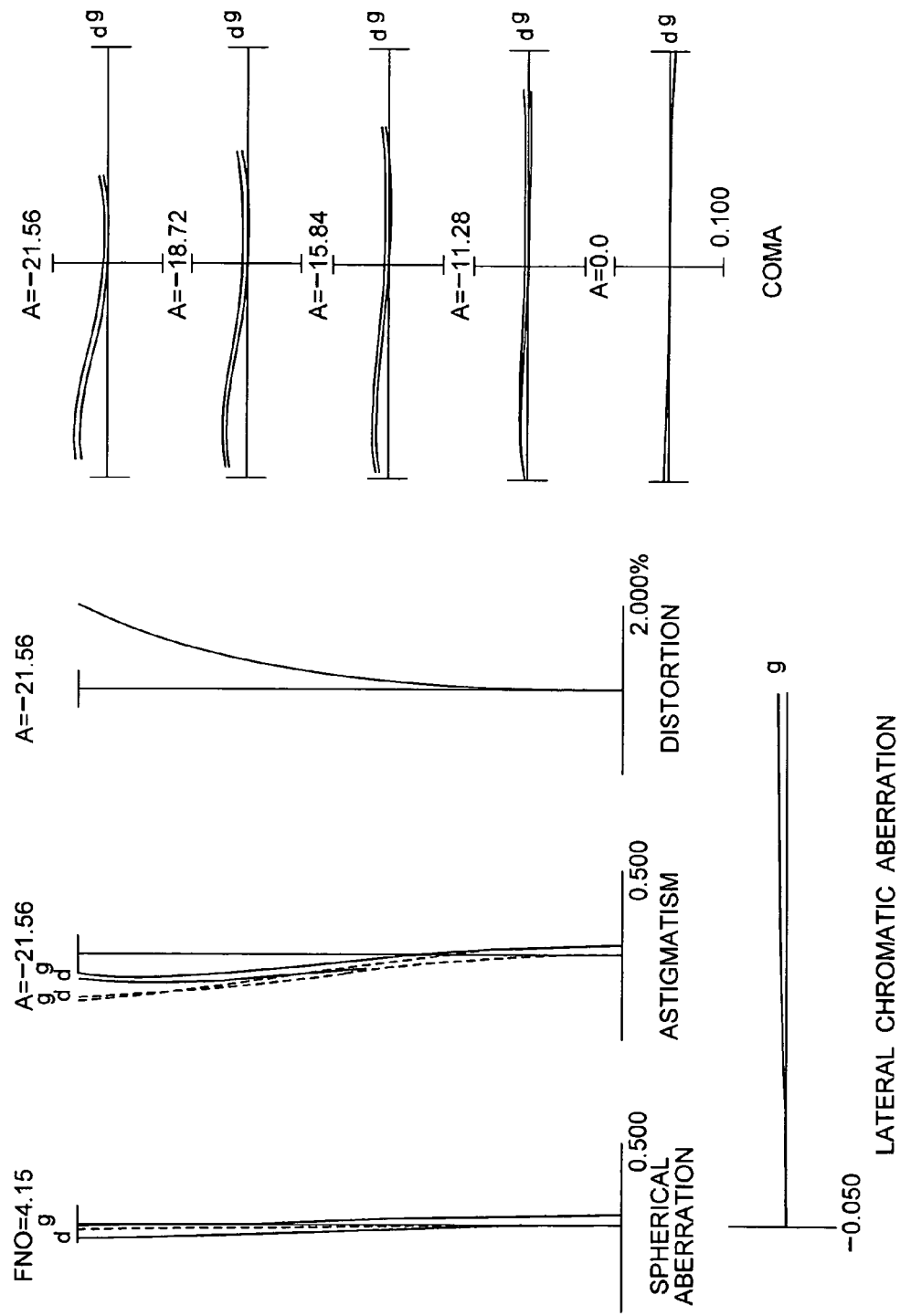
FIG. 20 graphically shows various aberrations of the zoom lens system according to Example 5 in an intermediate focal length state (f=35.0) when the system is focused at infinity.
Figure 21:
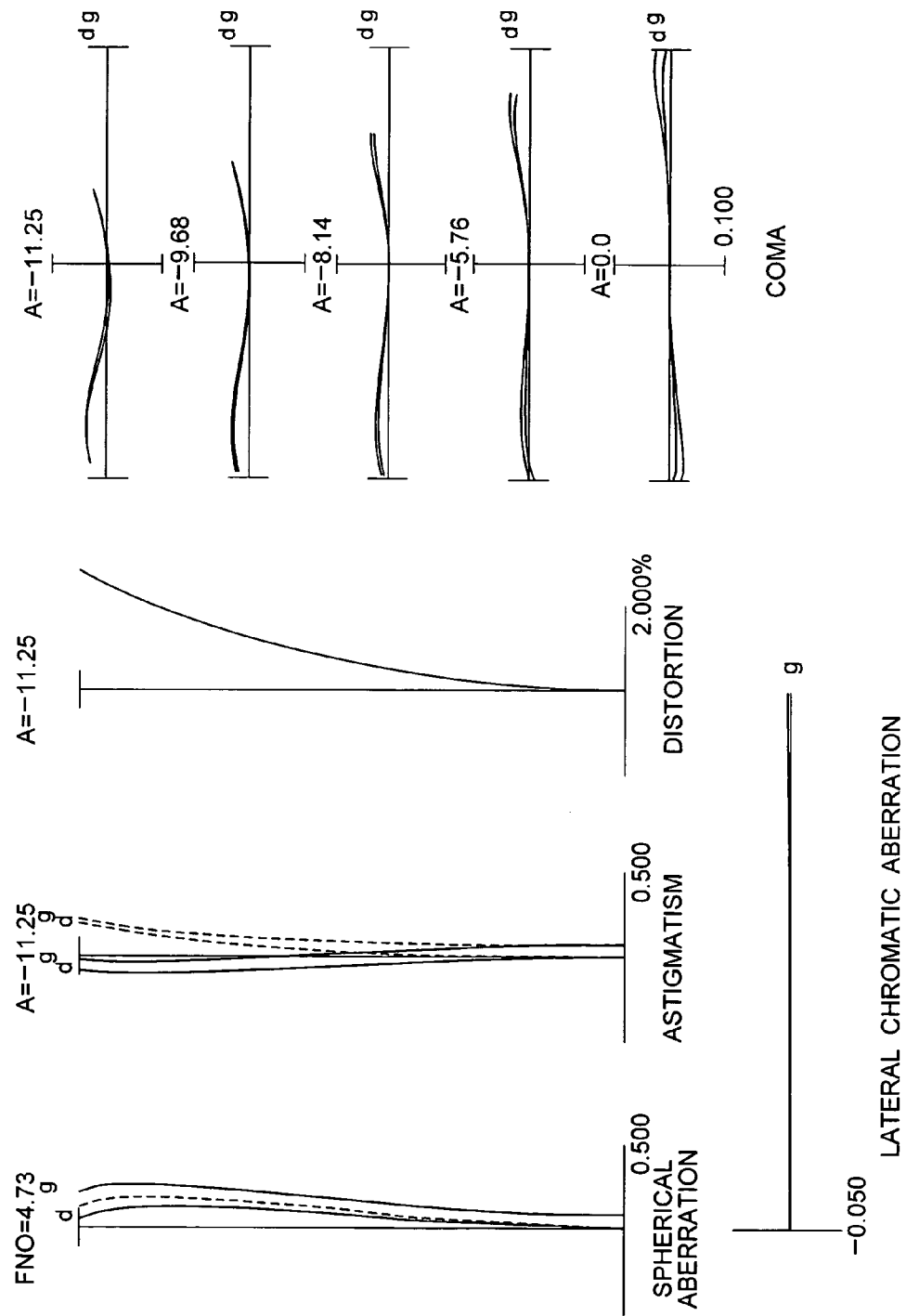
FIG. 21 graphically shows various aberrations of the zoom lens system according to Example 5 in a telephoto end state (f=68.9) when the system is focused at infinity.

FIG. 19 graphically shows various aberrations of the zoom lens system according to Example 5 in a wide-angle end state (f=18.5) when the system is focused at infinity. FIG. 20 graphically shows various aberrations of the zoom lens system according to Example 5 in an intermediate focal length state (f=35.0) when the system is focused at infinity. FIG. 21 graphically shows various aberrations of the zoom lens system according to Example 5 in a telephoto end state (f=68.9) when the system is focused at infinity.

As is apparent from the respective graphs, the zoom lens system according to Example 4 shows superb optical performance as a result of good corrections to various aberrations in each focal length state (the wide-angle end state, the intermediate focal length state, and the telephoto end state).

EXAMPLE 6

Figure 22:
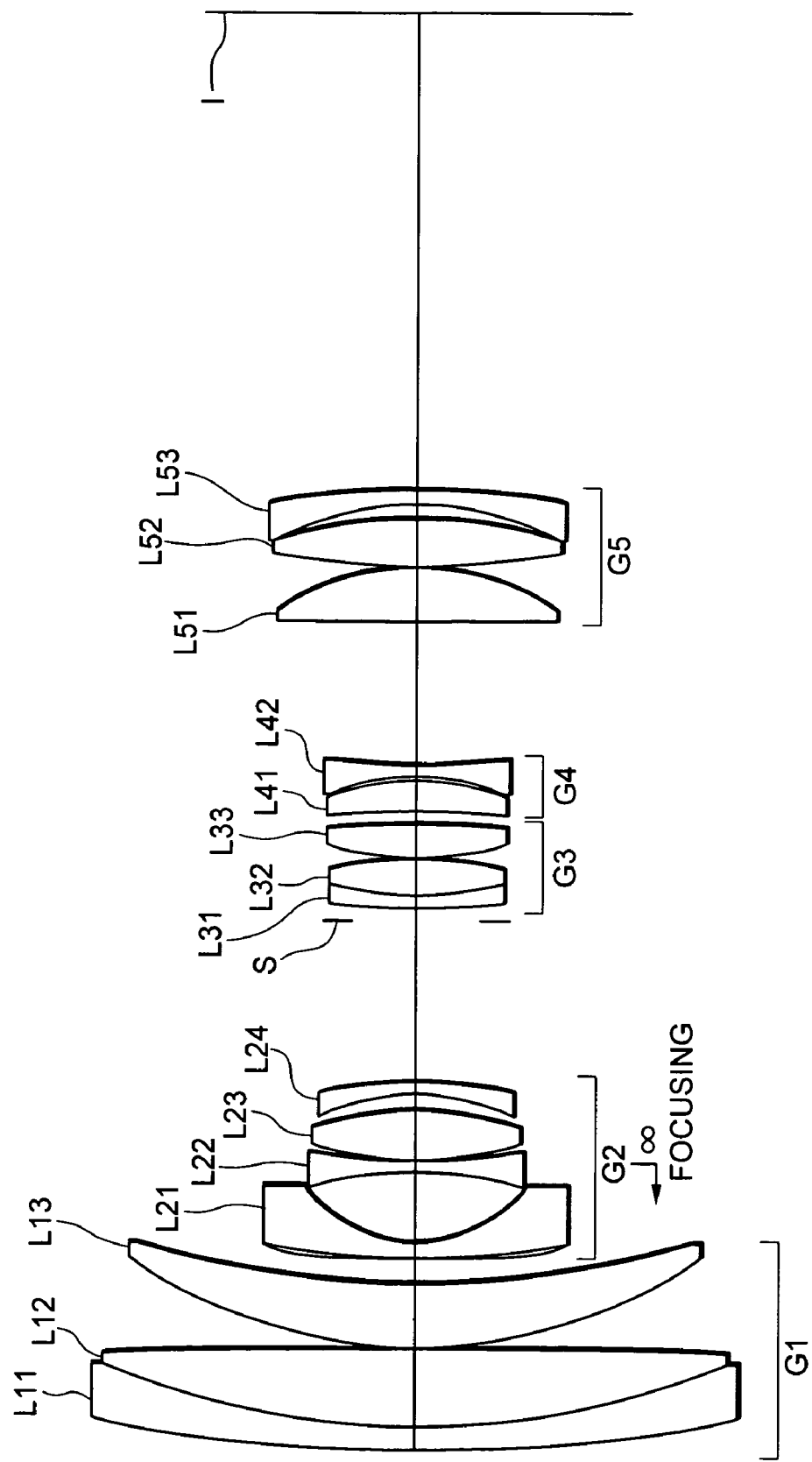
FIG. 22 is a drawing showing a lens construction of a zoom lens system according to Example 6 of the present invention.

FIG. 22 is a drawing showing a lens construction of a zoom lens system according to Example 6 of the present invention.

In a zoom lens system according to Example 6 of the present invention, the first lens group G1 is composed of, in order from the object, a cemented lens constructed by a negative meniscus lens L11 having a convex surface facing to the object cemented with a double convex positive lens L12, and a positive meniscus lens L13 having a convex surface facing to the object.

The second lens group G2 is composed of, in order from the object, a negative meniscus lens L21 having a convex surface facing to the object, a double concave negative lens L22, a double convex positive lens L23, and a negative meniscus lens L24 having a concave surface facing to the object.

The third lens group G3 is composed of, in order from the object, a cemented lens constructed by a negative meniscus lens L31 having a convex surface facing to the object cemented with a double convex positive lens L32, and a double convex positive lens L33.

The fourth lens group G4 is composed of, in order from the object, a positive meniscus lens L41 having a concave surface facing to the object, and a double concave negative lens L42.

The fifth lens group G5 is composed of, in order from the object, a positive meniscus lens L51 having a concave surface facing to the object, a double convex positive lens L52, and a negative meniscus lens L53 having a concave surface facing to the object.

In a zoom lens system according to Example 6 of the present invention, an aperture stop S is to the object side of the third lens group G3 and is moved together with the third lens group G3 upon changing state of lens group positions.

Moreover, the negative lens L21 in the second lens group G2 has a thin resin layer with an aspherical shape on the object side surface.

In a zoom lens system according to Example 6 of the present invention, focusing is carried out by moving the second lens group G2 along the optical axis.

Various values according to Example 6 are shown in Table 6.

TABLE 6

[Specifications]

|   | wide-angle end state | intermediate focal length state | telephoto end state |
|---|---|---|---|
| f = | 18.5 | 35.0 | 67.9 |
| FNO = | 3.6 | 4.2 | 4.7 |
| 2ω = | 76.6 | 43.3 | 23.1° |

[Lens Data]

| Surface Number | r | d | n | ν |
|---|---|---|---|---|
| 1 | 133.3025 | 1.80 | 1.84666 | 23.8 |
| 2 | 64.0775 | 6.30 | 1.65160 | 58.5 |
| 3 | −866.3960 | 0.10 | 1.00000 | |
| 4 | 40.3230 | 5.10 | 1.71300 | 53.9 |
| 5 | 76.7157 | D5 | 1.00000 | |
| *6 | 101.5185 | 0.05 | 1.55389 | 38.1 |
| 7 | 63.6067 | 1.20 | 1.83481 | 42.7 |
| 8 | 11.1203 | 5.75 | 1.00000 | |
| 9 | −30.7891 | 0.80 | 1.83481 | 42.7 |
| 10 | 39.3762 | 0.10 | 1.00000 | |
| 11 | 26.2881 | 4.10 | 1.84666 | 23.8 |
| 12 | −27.5261 | 1.30 | 1.00000 | |
| 13 | −17.8610 | 0.90 | 1.83481 | 42.7 |
| 14 | −36.3504 | D14 | 1.00000 | |
| 15 | 66.0776 | 1.00 | 1.84666 | 23.8 |
| 16 | 24.1930 | 3.00 | 1.49782 | 82.5 |
| 17 | −33.5672 | 0.10 | 1.00000 | |
| 18 | 22.5321 | 2.80 | 1.48749 | 70.2 |
| 19 | −89.0254 | D19 | 1.00000 | |
| 20 | −90.3887 | 2.60 | 1.84666 | 23.8 |
| 21 | −20.1007 | 0.25 | 1.00000 | |
| 22 | −17.9853 | 1.00 | 1.83481 | 42.7 |
| 23 | 61.9801 | D23 | 1.00000 | |
| 24 | −3844.0063 | 4.40 | 1.49782 | 82.5 |
| 25 | −19.1035 | 0.10 | 1.00000 | |
| 26 | 62.3257 | 3.85 | 1.60311 | 60.7 |
| 27 | −39.2402 | 1.20 | 1.00000 | |
| 28 | −23.4964 | 1.10 | 1.80518 | 25.4 |
| 29 | −66.1545 | BF | 1.00000 | |

[Aspherical Data]

Surface Number 6
κ = +1.8114
C4 = +2.7636 × $10^{-5}$
C6 = −7.0377 × $10^{-8}$
C8 = +1.9801 × $10^{-10}$
C10 = −1.1720 × $10^{-13}$

[Variable Distances]

|   | wide-angle end state | intermediate focal length state | telephoto end state |
|---|---|---|---|
| f | 18.5 | 35.0 | 67.9 |
| D5 | 2.01 | 13.67 | 29.54 |
| D14 | 14.30 | 7.27 | 2.98 |
| D19 | 0.99 | 7.39 | 11.29 |
| D23 | 11.86 | 5.46 | 1.56 |

[Values for Conditional Expressions]

| (1) (−f2)/fW = | 0.725 |
|---|---|
| (2) f3/fW = | 1.353 |
| (3) (−f4)/fW = | 2.000 |
| (4) f1/fW = | 4.187 |
| (5) BF/fW = | 2.077 |

Figure 23:
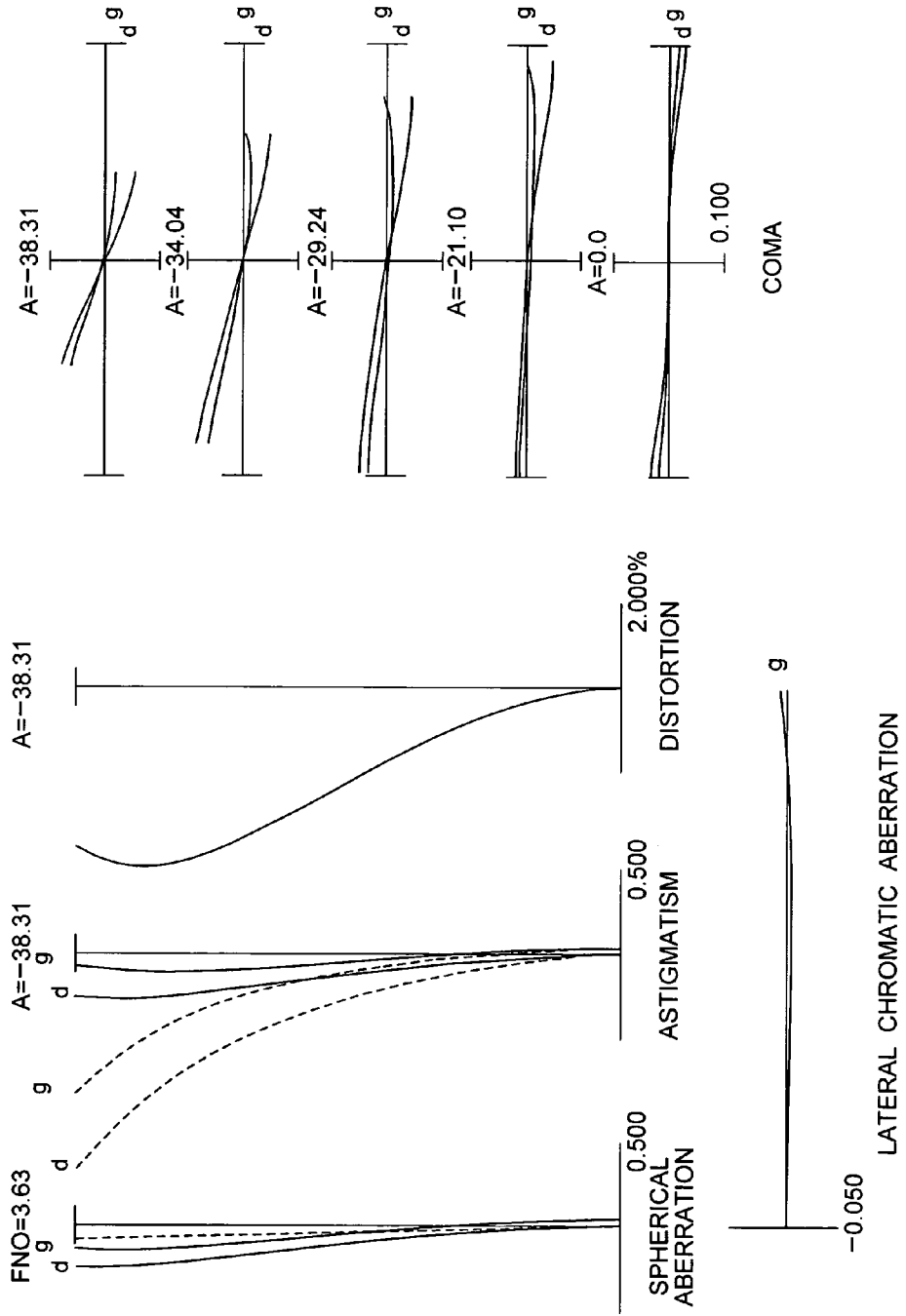
FIG. 23 graphically shows various aberrations of the zoom lens system according to Example 6 in a wide-angle end state (f=18.5) when the system is focused at infinity.
Figure 24:
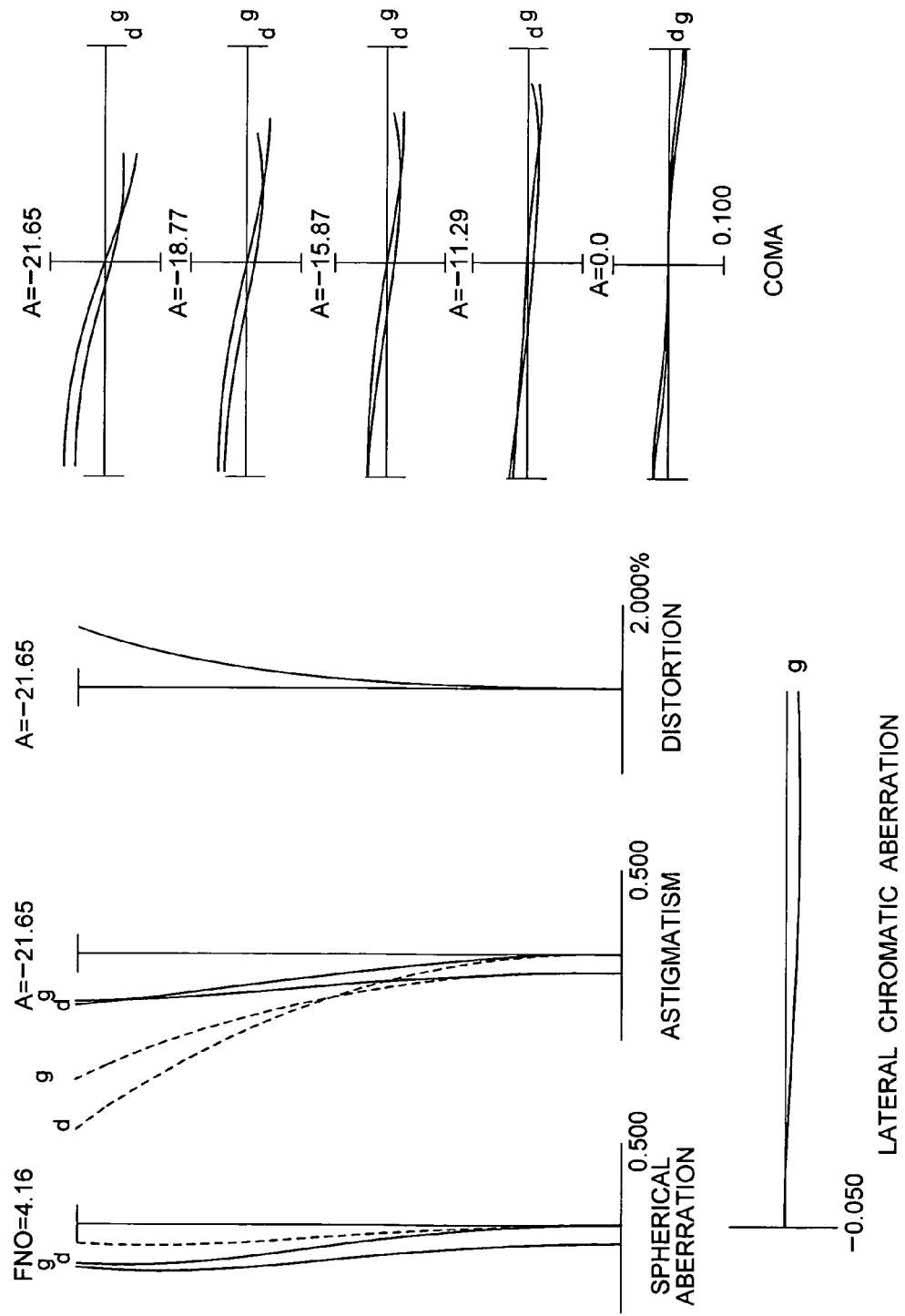
FIG. 24 graphically shows various aberrations of the zoom lens system according to Example 6 in an intermediate focal length state (f=35.0) when the system is focused at infinity.
Figure 25:
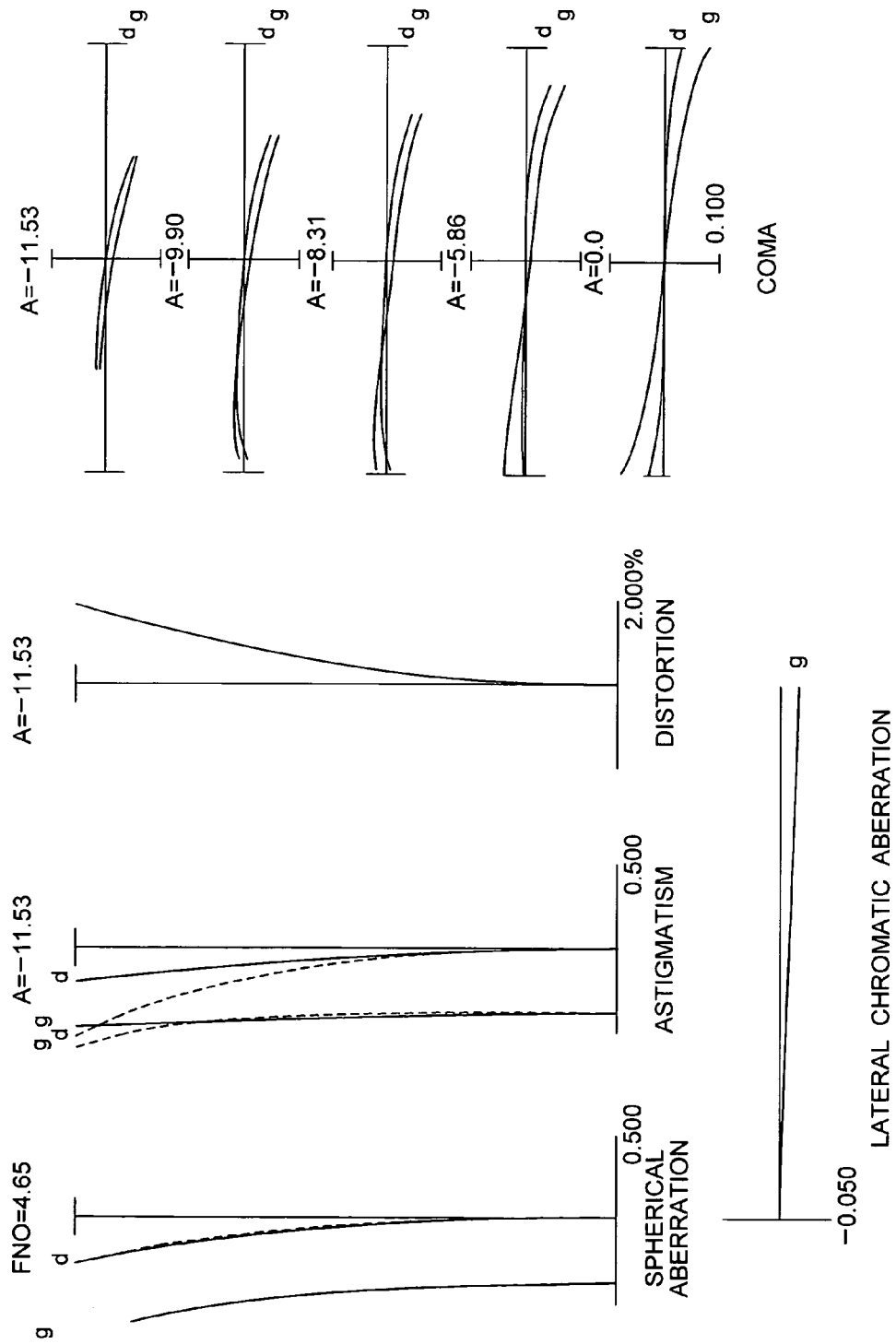
FIG. 25 graphically shows various aberrations of the zoom lens system according to Example 6 in a telephoto end state (f=67.9) when the system is focused at infinity.

FIG. 23 graphically shows various aberrations of the zoom lens system according to Example 6 in a wide-angle end state (f=18.5) when the system is focused at infinity. FIG. 24 graphically shows various aberrations of the zoom lens system according to Example 6 in an intermediate focal length state (f=35.0) when the system is focused at infinity. FIG. 25 graphically shows various aberrations of the zoom lens system according to Example 6 in a telephoto end state (f=67.9) when the system is focused at infinity.

As is apparent from the respective graphs, the zoom lens system according to Example 6 shows superb optical performance as a result of good corrections to various aberrations in each focal length state (the wide-angle end state, the intermediate focal length state, and the telephoto end state).

In a zoom lens system according to each Example of the present invention, although an aperture stop S is arranged between the second lens group G2 and the third lens group G3, the location of the aperture stop S is not limited to this place. It may be arranged, for example, between the third lens group G3 and the fourth lens group G4 or within the third lens group G3.

In a zoom lens system according to each Example of the present invention, focusing is carried out by moving the second lens group G2. However, a lens group other than the second lens group G2 may be used for carrying out focusing.

As described above, a zoom lens system according to each Example of the present invention is constructed by five lens groups. However, the lens system is not limited to this construction, and another lens group may be added to any intervals between adjacent lens groups, or to the vicinity of any lens group on the image side or the object side.

As described above, in a zoom lens system according to each Example of the present invention, an aspherical surface is used in the second lens group G2, so that curvature of field and distortion, in particular, can be corrected effectively. However, the present invention is not limited to this, and an aspherical surface can be also used in any lens group other than the second lens group G2.

In order to prevent a camera shake liable to happen to a zoom lens system with a high zoom ratio upon hand-held shooting, a zoom lens system according to each Example of the present invention makes it possible to compose a vibration reduction optical system by combining a vibration detection means and a driver to the zoom lens system. In this composition, at first, an image movement is detected by the vibration detection means. Then, in order to correct the image movement, a lens group or a portion of a lens group in the zoom lens system is decentered as a decentering lens group by the driver. Since the image is shifted by this action to correct the image movement, a camera shake upon hand-held shooting can be prevented.

In a zoom lens system according to each Example of the present invention, a diffractive optical element can easily employed to any lens surface. By applying a diffractive optical element to any lens surface of a zoom lens system according to each Example of the present invention, chromatic aberration, in particular, can be corrected preferably.

As described above, the present invention makes it possible to provide a zoom lens system with a high zoom ratio capable of preferably correcting aberrations with securing sufficient amount of back focal length by well-suited power arrangement. Moreover, the present invention makes it possible to provide a zoom lens system having a high zoom ratio with a short focal length capable of preferably correcting aberrations with securing sufficient amount of back focal length.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
   a first lens group having positive refractive power;
   a second lens group having negative refractive power; and
   a third lens group having positive refractive power; and
   a fourth lens group having negative refractive power,
   wherein when the state of lens group positions varies from the wide-angle end state to the telephoto end state,
   a distance between the first lens group and the second lens group increases,
   a distance between the second lens group and the third lens group decreases, and
   a distance between the third lens group and the fourth lens group increases, and
   wherein the following conditional expression is satisfied:

$$0.655<(-f2)/fw<2.000$$

where f2 denotes the focal length of the second lens group and fw denotes the focal length of the zoom lens system in the wide-angle end state.

2. The zoom lens system according to claim 1, further comprising:
   a fifth lens group having positive refractive power arranged to an image side of the fourth lens group;
   wherein when the state of lens group positions varies from the wide-angle end state to the telephoto end state,
   a distance between the fourth lens group and the fifth lens group decreases.

3. The zoom lens system according to claim 2, wherein the following conditional expression is satisfied:

$$1.18<f3/fw<2.50$$

where f3 denotes the focal length of the third lens group.

4. The zoom lens system according to claim 3, wherein the following conditional expression is satisfied:

$$1.92<(-f4)/fw<4.00$$

where f4 denotes the focal length of the fourth lens group.

5. The zoom lens system according to claim 3, wherein the following conditional expression is satisfied:

$$3.78<f1/fw<6.00$$

where f1 denotes the focal length of the first lens group.

6. The zoom lens system according to claim 3, wherein the following conditional expression is satisfied:

$$1.8<BF/fw<6.0$$

where BF denotes the back focal length of the zoom lens system in the wide-angle end state.

7. The zoom lens system according to claim 2, wherein the following conditional expression is satisfied:

$$1.92<(-f4)/fw<4.00$$

where f4 denotes the focal length of the fourth lens group.

8. The zoom lens system according to claim 2, wherein the following conditional expression is satisfied:

$$3.78<f1/fw<6.00$$

where f1 denotes the focal length of the first lens group.

9. The zoom lens system according to claim 2, wherein the following conditional expression is satisfied:

$$1.8<BF/fw<6.0$$

where BF denotes the back focal length of the zoom lens system in the wide-angle end state.

10. The zoom lens system according to claim 2, wherein the second lens group has at least one aspherical surface.

11. The zoom lens system according to claim 2, wherein focusing from infinity to near object is conducted by moving the second lens group.

12. The zoom lens system according to claim 1, wherein the following conditional expression is satisfied:

$$1.18<f3/fw<2.50$$

where f3 denotes the focal length of the third lens group.

13. The zoom lens system according to claim 1, wherein the following conditional expression is satisfied:

$$1.92<(-f4)/fw<4.00$$

where f4 denotes the focal length of the fourth lens group.

14. The zoom lens system according to claim 1, wherein the following conditional expression is satisfied:

$$3.78<f1/fw<6.00$$

where f1 denotes the focal length of the first lens group.

15. The zoom lens system according to claim 1, wherein the following conditional expression is satisfied:

$$1.8<BF/fw<6.0$$

where BF denotes the back focal length of the zoom lens system in the wide-angle end state.

16. A zoom lens system comprising, in order from an object:
  a first lens group having positive refractive power;
  a second lens group having negative refractive power; and
  a third lens group having positive refractive power,
  wherein when the state of lens group positions varies from a wide-angle end state to a telephoto end state,
  a distance between the first lens group and the second lens group increases, and
  a distance between the second lens group and the third lens group decreases, and
  wherein the following conditional expressions are satisfied:

$$1.8<BF/fw<6.0$$

$$0.655<(-f2)/fw<2.000$$

where BF denotes the back focal length of the zoom lens system in the wide-angle end state, f2 denotes the focal length of the second lens group and fw denotes the focal length of the zoom lens system in the wide-angle end state.

17. The zoom lens system according to claim 16, wherein the following conditional expression is satisfied:

$$1.18<f3/fw<2.50$$

where f3 denotes the focal length of the third lens group.

18. The zoom lens system according to claim 16, wherein the following conditional expression is satisfied:

$$3.78<f1/fw<6.00$$

where f1 denotes the focal length of the first lens group.

19. The zoom lens system according to claim 16, wherein the second lens group has at least one aspherical surface.

20. The zoom lens system according to claim 16, wherein focusing from infinity to near object is conducted by moving the second lens group.

21. A method for forming an image of an object and varying a total focal length, comprising:
  providing a lens system that includes a first lens group having positive refractive power, a second lens group having negative refractive power, a third lens group having positive refractive power, and a fourth lens group having negative refractive power, in order from the object,
  the lens system satisfying the following conditional expression:

$$0.655<(-f2)/fw<2.000$$

where f2 denotes the focal length of the second lens group and fw denotes the focal length of the lens system in a wide-angle end state; and
  varying the total focal length by moving the first lens group, the second lens group the third lens group, and the fourth lens group, increasing a distance between the first lens group and the second lens group, decreasing a distance between the second lens group and the third lens group, and increasing a distance between the third lens group and the fourth lens group when the lens system moves from the wide-angle end state to the telephoto end state.

22. The method according to claim 21, wherein the lens system further comprises a fifth lens group having positive refractive power arranged to an image side of the fourth lens group, and wherein the step of varying the total focal length includes moving the fifth lens group and decreasing a distance between the fourth lens group and the fifth lens group when the lens system moves from the wide-angle end state to the telephoto end state.

23. The method according to claim 22, wherein the lens system is provided to satisfy the following conditional expression:

$$1.18<f3/fw<2.50$$

where f3 denotes the focal length of the third lens group.

24. The method according to claim 22, wherein the lens system is provided to satisfy the following conditional expression:

$$1.8<BF/fw<6.0$$

where BF denotes the back focal length of the lens system in the wide-angle end state.

25. A method for forming an image of an object and varying a total focal length, comprising:
  providing a lens system that includes a first lens group having positive refractive power, a second lens group having negative refractive power, and a third lens group having positive refractive power, in order from the object,
  the lens system satisfying the following conditional expressions:

$$0.655<(-f2)/fw<2.000$$

$$1.8<BF/fw<6.0$$

where f2 denotes the focal length of the second lens group, BF denotes the back focal length of the zoom lens system in the wide-angle end state and fw denotes the focal length of the lens system in a wide-angle end state; and
  varying the total focal length by moving the first lens group, the second lens group and the third lens group, increasing a distance between the first lens group and the second lens group, and decreasing a distance between the second lens group and the third lens group when the lens system moves from the wide-angle end state to a telephoto end state.

* * * * *